(12) United States Patent
Patel et al.

(10) Patent No.: US 12,261,774 B2
(45) Date of Patent: Mar. 25, 2025

(54) SYSTEM AND METHOD FOR ROUTING A SERIAL DIGITAL INTERFACE (SDI) SIGNAL

(71) Applicant: Evertz Microsystems Ltd., Burlington (CA)

(72) Inventors: Rakesh Thakor Patel, Mississauga (CA); Jeff Wei, Richmond Hill (CA); Konstantinos Lianos, Mississauga (CA)

(73) Assignee: Evertz Microsystems Ltd., Burlington (CA)

( * ) Notice: Subject to any disclaimer, the term of this patent is extended or adjusted under 35 U.S.C. 154(b) by 29 days.

(21) Appl. No.: 17/701,733

(22) Filed: Mar. 23, 2022

(65) Prior Publication Data
US 2022/0311706 A1 Sep. 29, 2022

Related U.S. Application Data

(60) Provisional application No. 63/164,856, filed on Mar. 23, 2021.

(51) Int. Cl.
*H04L 45/00* (2022.01)
*G06F 13/42* (2006.01)
(Continued)

(52) U.S. Cl.
CPC ........ *H04L 45/566* (2013.01); *G06F 13/4282* (2013.01); *H04L 45/42* (2013.01); *H04L 45/745* (2013.01)

(58) Field of Classification Search
None
See application file for complete search history.

(56) References Cited

U.S. PATENT DOCUMENTS

| 8,228,861 B1 * | 7/2012 | Nix | H04L 1/0009 370/329 |
| 2009/0080428 A1 * | 3/2009 | Witkowski | H04L 49/357 370/392 |

(Continued)

OTHER PUBLICATIONS

Matthias Laabs, "SDI over IP—seamless signal switching in SMPTE 2022-6 and a novel multicast routing concept," EBU Technical Review—2012 Q4, European Broadcasting Union, Geneva, Switzerland, ISSN: 1609-1469, Nov. 28, 2012, pp. 1-7.

*Primary Examiner* — William G Trost, IV
*Assistant Examiner* — Christopher P Cadorna
(74) *Attorney, Agent, or Firm* — SMART & BIGGAR LP

(57) ABSTRACT

Apparatus, systems and methods for routing an input serial digital interface (SDI) signal from an input SDI port to an output SDI port are described. In at least one embodiment, at least one input card, at least one output card, a midplane coupled to the at least one input card and at least one output card and a controller coupled to the midplane are disclosed. At least one input card being configured to receive the input SDI signal at the input SDI port, process the input SDI signal to generate one or more packetized media streams, each including a plurality of packets, with each packet having a packet header including a source address corresponding to that packetized media stream, and transmit each packetized media stream from an IP output port to the midplane. The midplane being configured to identify the source address corresponding to each packet of a packetized media stream, process the corresponding packets to insert a destination address based on controller instructions, and generate and route a corresponding processed packetized media stream based on the destination address. The output card being configured to receive one or more processed packetized media streams at an input IP port, process the received
(Continued)

streams to generate a corresponding output SDI signal, and provide the output SDI signal at the output SDI port.

20 Claims, 23 Drawing Sheets

(51) Int. Cl.
*H04L 45/42* (2022.01)
*H04L 45/745* (2022.01)

(56) References Cited

U.S. PATENT DOCUMENTS

| | | | |
|---|---|---|---|
| 2017/0104974 A1* | 4/2017 | Bak | H04N 19/61 |
| 2019/0028776 A1* | 1/2019 | Arai | H04N 21/234381 |
| 2019/0394128 A1* | 12/2019 | Yang | H04L 69/325 |
| 2022/0038372 A1* | 2/2022 | Gafni | H04L 45/42 |
| 2022/0377043 A1* | 11/2022 | Yang | H04M 15/66 |

* cited by examiner

SYSTEM AND METHOD FOR ROUTING A SERIAL DIGITAL INTERFACE (SDI) SIGNAL

REFERENCE TO RELATED APPLICATIONS

This application claims the benefit of U.S. Provisional Application No. 63/164,856 filed on Mar. 23, 2021, which is incorporated by reference herein in its entirety.

FIELD

Various embodiments are described herein that generally relate to a routing system, and in particular, to an improved routing system for routing serial digital interface (SDI) signals between devices through a midplane capable of carrying packetized signals, and a method of operating the same.

INTRODUCTION

Current SDI routers suffer numerous drawbacks including, inter alia, poor scalability and operational inefficiencies. It is therefore desirable to provide an SDI router that can overcome at least some of these drawbacks.

SUMMARY OF VARIOUS EMBODIMENTS

In accordance with a broad aspect of the teachings herein, there is provided at least one embodiment a system for routing an input serial digital interface (SDI) signal from an input SDI port to an output SDI port, the system comprising:
 at least one input card coupled to the input SDI port;
 at least one output card coupled to the output SDI port;
 a midplane coupled to the at least one input card and the at least one output card; and
 a controller coupled to the midplane;
 the at least one input card being configured to:
  receive the input SDI signal at the input SDI port;
  process the input SDI signal to generate one or more packetized media streams, each packetized media stream comprising a plurality of packets, wherein each packet has a packet header comprising a source address corresponding to that packetized media stream; and
  transmit each packetized media stream from an IP output port to the midplane;
 the midplane being configured to:
  identify the source address corresponding to each packet of a packetized media stream;
  update the corresponding packets of each packetized media stream with a destination address based on the control signal from the controller, and generate a corresponding processed packetized media stream; and
  route the processed packetized media stream to an output card based on the destination address; and
 the output card being configured to:
  receive one or more processed packetized media streams at an input IP port;
  process the one or more processed packetized media streams to generate a corresponding output SDI signal; and
  providing the output SDI signal at the output SDI port.

In some embodiments, the source address includes a flow identifier uniquely identifying the corresponding packetized media stream.

In some other embodiments, the flow identifier is related to the SDI input port receiving the input SDI signal corresponding to the packetized media stream.

In some embodiments, the flow identifier identifies source information associated with the packetized media stream.

In some further embodiments, the flow identifier identifies the input card and the SDI input port receiving the input SDI signal corresponding to the packetized media stream, and the output IP port transmitting the packetized media stream.

In some other embodiments, the source address further includes a routing identifier, wherein the routing identifier identifies source information associated with the packetized media stream.

In some embodiments, the source address further includes a routing identifier, wherein the routing identifier identifies the input card and the SDI input port receiving the input SDI signal corresponding to the packetized media stream, and the output IP port transmitting the packetized media stream.

In some embodiments, the destination address includes a flow identifier uniquely identifying the corresponding processed packetized media stream.

In some other embodiments, the flow identifier is related to the SDI output port receiving the output SDI signal corresponding to the processed packetized media stream.

In some other embodiments, the flow identifier identifies destination information associated with the processed packetized media stream.

In some further embodiments, the flow identifier identifies the output card and the SDI output port providing the output SDI signal corresponding to the processed packetized media stream, and the input IP port receiving the processed packetized media stream.

In some embodiments, the destination address further includes a routing identifier, wherein the routing identifier identifies destination information associated with the processed packetized media stream.

In some other embodiments, the destination address further includes a routing identifier, wherein the routing identifier identifies the output card and the SDI output port providing the output SDI signal corresponding to the processed packetized media stream, and the input IP port receiving the packetized media stream.

In some embodiments, an address inserting module in the midplane is configured to replace the flow identifier associated with the source address with a flow identifier associated with the destination address.

In some other embodiments, an address inserting module in the midplane is configured to replace the routing identifier associated with the source address with a routing identifier associated with the destination address.

In accordance with another broad aspect of the teachings herein, there is provided at least one embodiment a method for routing an input serial digital interface (SDI) signal from an input SDI port to an output SDI port, the method comprising:
 receiving the input SDI signal at the input SDI port at an input card;
 processing the input SDI signal to generate one or more packetized media streams, each packetized media stream comprising a plurality of packets, wherein each packet has a packet header comprising a source address corresponding to that packetized media stream;
 transmitting each packetized media stream from an IP output port to a midplane;

In accordance with another broad aspect of the teachings herein, there is provided at least one embodiment a method for routing an input serial digital interface (SDI) signal from an input SDI port to an output SDI port, the method comprising:

receiving one or more packetized media streams at a midplane;

identifying a source address corresponding to each packet of a packetized media stream;

processing the corresponding packets of each packetized media stream with a destination address based on control signal from controller coupled to the midplane;

generating a corresponding processed packetized media stream; and routing the processed packetized media stream to an output card based on the destination address.

In accordance with another broad aspect of the teachings herein, there is provided at least one embodiment a method for routing an input serial digital interface (SDI) signal from an input SDI port to an output SDI port, the method comprising:

receiving one or more processed packetized media streams at an input IP port at an output card based on a destination address;

processing the one or more processed packetized media streams to generate a corresponding output SDI signal; and providing the output SDI signal at an output SDI port.

In some embodiments, the source address includes a flow identifier uniquely identifying the corresponding packetized media stream.

In some other embodiments, the flow identifier is related to the SDI input port receiving the input SDI signal corresponding to the packetized media stream.

In some embodiments, the flow identifier identifies source information associated with the packetized media stream.

In some further embodiments, the flow identifier identifies the input card and the SDI input port receiving the input SDI signal corresponding to the packetized media stream, and the output IP port transmitting the packetized media stream.

In some other embodiments, the source address further includes a routing identifier, wherein the routing identifier identifies source information associated with the packetized media stream.

In some embodiments, the source address further includes a routing identifier, wherein the routing identifier identifies the input card and the SDI input port receiving the input SDI signal corresponding to the packetized media stream, and the output IP port transmitting the packetized media stream.

In some embodiments, the destination address includes a flow identifier uniquely identifying the corresponding processed packetized media stream.

In some other embodiments, the flow identifier is related to the SDI output port receiving the output SDI signal corresponding to the processed packetized media stream.

In some other embodiments, the flow identifier identifies destination information associated with the processed packetized media stream.

In some further embodiments, the flow identifier identifies the output card and the SDI output port providing the output SDI signal corresponding to the processed packetized media stream, and the input IP port receiving the processed packetized media stream.

In some embodiments, the destination address further includes a routing identifier, wherein the routing identifier identifies destination information associated with the processed packetized media stream.

In some other embodiments, the destination address further includes a routing identifier, wherein the routing identifier identifies the output card and the SDI output port providing the output SDI signal corresponding to the processed packetized media stream, and the input IP port receiving the packetized media stream.

In some embodiments, an address inserting module in the midplane is configured to replace the flow identifier associated with the source address with a flow identifier associated with the destination address.

In some other embodiments, an address inserting module in the midplane is configured to replace the routing identifier associated with the source address with a routing identifier associated with the destination address.

It will be appreciated by a person skilled in the art that a system, method or computer readable medium disclosed herein may embody any one or more of the features contained herein and that the features may be used in any particular combination or sub-combination. These and other aspects and features of various embodiments will be described in greater detail below.

BRIEF DESCRIPTION OF THE DRAWINGS

For a better understanding of the various embodiments described herein, reference will be made, to the accompanying drawings. The drawings are not intended to limit the scope of the teachings described herein.

Figure 1:
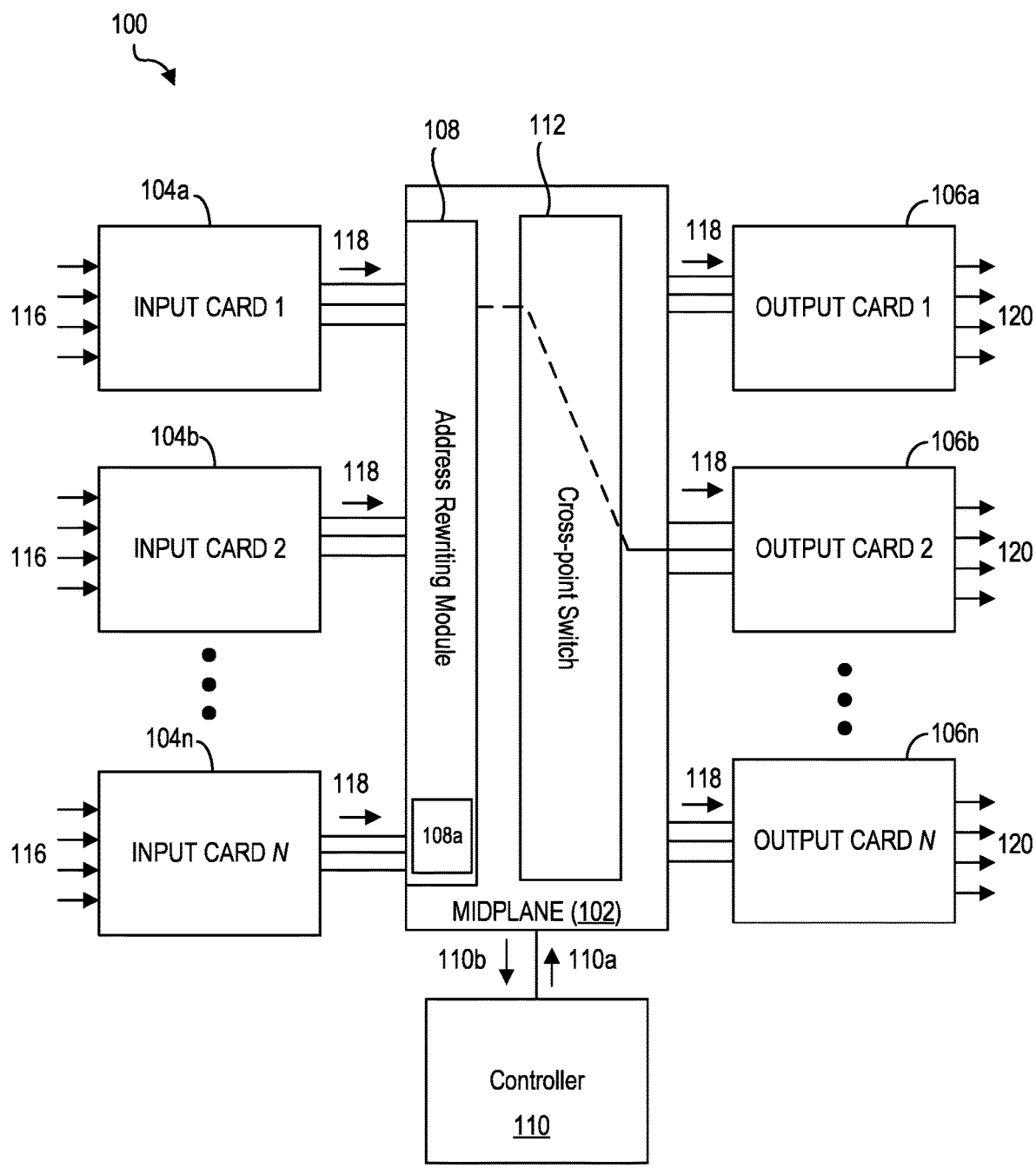
FIG. 1 is a block diagram of an SDI router in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. For simplicity and clarity of illustration, where considered appropriate, reference numerals may be repeated among the drawings to indicate corresponding or analogous elements or steps.

DESCRIPTION OF VARIOUS EMBODIMENTS

Figure 2:
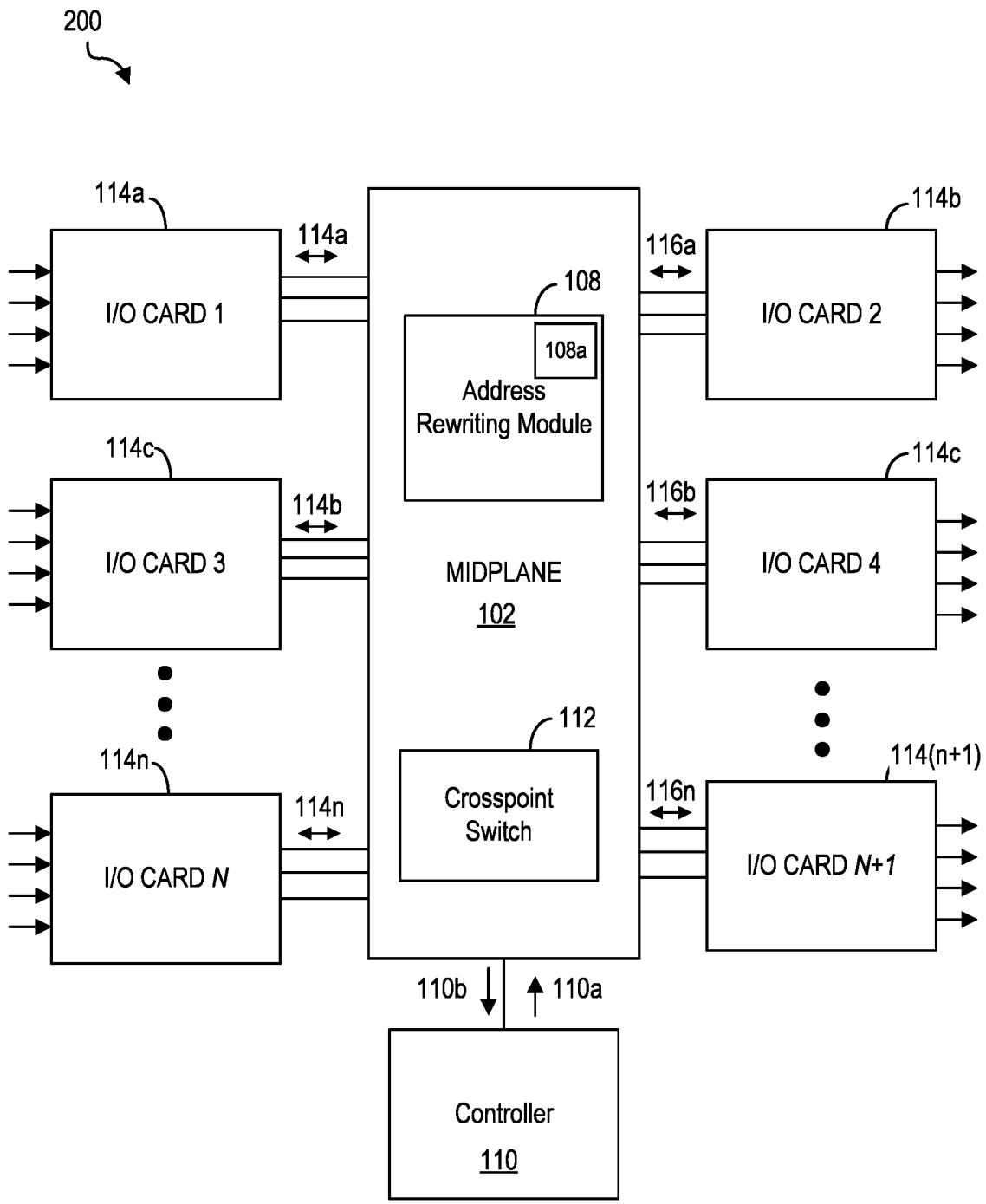
FIG. 2 is a block diagram of an SDI router in accordance with an example embodiment.

Reference is made concurrently to FIGS. 1 and 2, which show example embodiments of serial digital interface (SDI) routers 100 and 200 respectively.

FIG. 1 shows an example embodiment of an SDI router 100 that generally includes one or more input cards 104a-104n, one or more output cards 106a-106n and a midplane 102 which couples the one or more input cards 104a-104n to the one or more output cards 106a-106n. The router 100 further includes a controller 110, which is communicably coupled to the midplane 102. In various embodiments provided herein, the controller 110 is operable to control operations of the various components comprising the midplane 102. FIG. 2 shows another example embodiment of an SDI router 200. The SDI router 200 of FIG. 2 is generally analogous to the SDI router 100 of FIG. 1, but includes a plurality of input/output (I/O) cards 114a-114n instead of the input and output cards 104, 106 allowing for bidirectional routing of SDI signals.

The SDI routers 100, 200 will now be described, first at a generally high level, and then at a more granular and detailed level.

Referring first to FIG. 1, which shows the SDI router 100. The SDI router 100 of FIG. 1 generally operates as follows: each of the input cards 104 is configured to receive one or more SDI signals 116 at one or more SDI ports of the input cards 102. The SDI signals 116 may be received, for example, from one or more upstream devices that are coupled to the SDI ports on each input card 104. The upstream devices may include an SDI source device, or a device capable of processing or forwarding an SDI signal received from another device. The input cards 104 convert (i.e., transform) the received SDI signals 116 to generate one or more corresponding packetized media streams 118 (i.e., media streams comprising a plurality of packets that encapsulate data from the SDI signal). For example, an SDI signal may be received at an input card, and may include one or more of video, audio and ancillary data components. In some cases, the audio components may be embedded in the video components. In some other cases, the audio components may not be embedded in the video components. The input card 104 can extract (i.e., de-encapsulate) each of these media components, and convert each media component into a separate packetized stream. For example, the input card may be configured to generate a video stream, one or more audio streams, a VANC or vertical ancillary data stream, or one or more of derivative streams consisting of derivative(s) of the video, audio or VANC components etc.). Each packet, in each stream, carries a payload corresponding to at least a portion of the packetized media content. In some embodiments provided herein, the packetized streams may comprise packets that are modified internet protocol (IP) packets.

From the input cards 104, the media streams 118 are transmitted to the midplane 102 through a corresponding IP output port of each input card 104. Midplane 102 is configured to receive the media streams 118, determine a corresponding destination output card 106 for each media stream 118 based on a controller signal, replaces the source address within the packets of each media stream 118 to a destination address, and route the media streams 118 to the appropriate output card 106.

In some embodiments, the midplane 102 in FIGS. 1 and 2 (as well as in FIGS. 9A and 9B) comprises a router card having signal routing capabilities. In some other embodiments, the midplane includes processing capabilities. For example, in such embodiments, the midplane 102 consists of a network processor card having routing as well as signal processing capabilities.

The output cards 106a-106n, which are also connected to the midplane 102, receive the media streams through one or more IP input ports of the output cards. The output cards 106a-106n then convert the packetized media streams back into SDI signals. That is, each output card 106 de-encapsulates the one or more received packetized media streams to retrieve the corresponding content data, and construct an SDI output signal 120 from the retrieved content data, including one or more of video, audio and data (e.g. VANC) components. The SDI output signals 120 are then transmitted through one or more designated SDI ports of the output card 106 to downstream devices.

The SDI output signal 120 may or may not be identical, in terms of inherent media components, to the SDI input signal 116. In some cases, the SDI input signal 116 may be routed to an output card 106 'as is', i.e. without addition or removal of any other media content or component. In such cases, the SDI output signal 120 will include identical content to the SDI input signal 116, but will be a reconstructed version of the SDI input signal 116. For example, in such cases, the SDI input signal 116 will be packetized to generate one or more media streams, which will be re-addressed and routed by the midplane to an appropriate output card 106, where the stream will be de-encapsulated (or depacketized) and the resultant content data will be combined to construct the SDI output signal 120.

In some other cases, where, for example, the SDI output signal 120 may be a combination of two or more SDI input signals 116, or SDI output signal 120 is a processed version of the SDI input signal 116 etc., the composition of the SDI output signal 120 will not be identical to the composition of any one SDI input signal 116.

FIG. 2 shows an analogous SDI router 200 which does not include input and output cards, but includes bi-directional input/output (I/O) cards 114 which can either adopt the functionality of input cards (i.e., converting SDI signals into packetized media streams), and can adopt the functionality of output cards (i.e., converting packetized media streams back into SDI signals), depending on the flow direction of the signals and/or streams.

In the illustrated embodiments, the SDI routers 100, 200 are operable to route one or more SDI signals by converting these SDI signals into packetized media streams and routing these media stream packets through the midplane 102. The packetized media streams are routed through a midplane capable of routing packetized signals, and such midplanes may include a crosspoint switch, a switching fabric, a software defined network (SDN), or any other IP routing core, etc.

By routing SDI signals as packetized streams, the SDI routers may achieve increased scalability as compared to traditional SDI routers. Specifically, traditional SDI routers, which simply route SDI signals between input and output SDI ports, are often based on a fixed-size signal switching matrix, and when the router ports reach capacity, growing beyond the limits of the router framework tends to be disruptive and expensive. However, by converting SDI signals into packetized streams, the improved router can benefit from IP routing capabilities—which are not based on using fixed size crosspoint switches, and allow for scalability and greater flexibility.

In some embodiments, the SDI routers 100, 200 are configured to receive a packetized signal directly from a source device. The packetized signal may include IP packets including a destination address in the packet header. In such embodiments, the SDI routers 100, 200 are configurable to route the packetized signal to the destination source based, via the midplane 102, based on the destination address in the packets. In some cases, the SDI routers 100, 200 may be integrated with an IP router so that both SDI and IP signals can be transported through a single midplane 102.

Reference is again made to FIG. 1, which shows input cards 104a-104n, where each input card includes SDI ports that are configured to receive SDI signals. In one example, router 100 includes 16 SDI ports per SDI card. In another example, router 100 includes 32 SDI ports per SDI card. The SDI signals received at the input cards 104 may include video signals (i.e., standard definition, high definition, 4K, ultraHD, etc.). Some non-limiting examples of SDI signals include SD-SDI, HD-SDI, 3G-SDI, 6G-SDI, and 12G-SDI signal. The SDI signals may alternatively be any other non-packetized serial signal.

In various cases, the received SDI signals also include embedded data, such as embedded audio data and/or embedded ancillary data. For example, in an SD-SDI and HD-SDI signal, there may be up to sixteen channels of embedded audio encapsulated into the SDI stream. In such cases, the SD-SDI signal may encapsulate audio data according to the SMPTE 272M standard, whereas an HD-SDI signal may encapsulate audio streams according to an SMPTE 299M standard. Similarly, in an 3G-SDI stream, up to 32 audio channels may be embedded (i.e., encapsulated) into the SDI stream. In many cases, SDI signals can also include embedded ancillary data, otherwise known as metadata (i.e., Horizontal Ancillary Data (HANC) or Vertical Ancillary Data (VANC)). This ancillary data can include, for instance, non-video and non-audio payloads, such as timecodes, closed captions, etc.

As previously stated, each of the input cards 104 is configured to receive the one or more SDI signals, and convert the SDI signals into one or more packetized media streams. The packetized streams may comprise a plurality of packets, where the packets may or may not be IP packets. In some embodiments, the packets within the stream are not IP packets. For example, the packets generated by the input cards 104 may not include the destination address for the packet. This may be because in various cases, the input cards 104 and the output cards 106 may be indifferent to each other, e.g. may not be aware of each other. That is, the input cards 102 need not be aware of the destination address for each generated packet in a media stream, and the output cards 106 need not be aware of the source address of each packet in the media stream. Rather, in the SDI routers 100, 200, only the controller 110 may be "aware" of the source, destination and routing path for each media stream, as between the input cards 104 and the output cards 106.

In various embodiments, each stream generated by the input cards 104 consists of packets where the packet header only specifies a source address. In some cases, the source address includes an SDI input card number, an SDI port number, an IP port number and a flow identifier. In some other cases, the source address incudes an SDI input card number, an IP port number and a flow identifier. In some further cases, the source address only includes a flow identifier. In these examples, the SDI input card number refers to the input card 104 where the input SDI signal is received. The SDI port number refers to the SDI port within the input card 104 where the input SDI signal is received. The IP port number refers to the IP port used to transmit the packetized media streams to the midplane 102 from the input card 104. The flow identifier is an identifier associated with each packetized media stream generated by the input card 104. All the packets within a same packetized media stream have a same flow identifier.

As shown in FIG. 1, the midplane 102 may include an address inserting module 108 as well as a crosspoint switch 112. Each of the address inserting module 108 and the crosspoint switch 112 may be controlled by various control signals 110 generated by the controller 100.

The address inserting module 108 receives the packetized media streams generated by each input card 104, and based on control signals 110a received from the controller 110 (i.e., addressing instructions), replaces the source address in each packet of the packetized media stream with a destination address. In other cases, the source address may not be overwritten by the address inserting module 108 to include the destination address, but rather, the destination address may be simply appended to each stream packet in addition to the source address. In some further cases, where the packets being received by the address inserting module 108 do not have any source address, the address inserting module 108 is configured to insert a destination address in the packets. In such cases, the controller 110 may provide instruction signals, identifying the destination address, to the address rewriting module 108 based on certain address inserting rules. Such address inserting rules may be predefined or dynamically changeable by an operator.

In various cases, the destination address includes information about the destination SDI output card 106 which is to receive the packetized stream(s). In some other cases, the destination address includes information identifying both the SDI output card 106 as well as the SDI output port within the SDI output card 106. In some further cases, the destination address includes information additionally identifying the IP port receiving the media stream. In all cases, the destination address also includes a flow identifier uniquely identifying each packetized media stream to be received at the SDI output card 106.

Once the address inserting module 108 adds the destination address into each packet of a given packetized stream, the packetized stream is forwarded to the appropriate IP port on an output card 106, via the crosspoint switch 112.

The crosspoint switch 112 is configured to route each packetized streams to the relevant IP input card for each output card 106 based on the destination address included in each packet of that stream. The crosspoint switch 112 may receive control signals 110a from the controller 110, where the control signals 110 may include forwarding tables that indicate how to forward each stream through the corresponding routing nodes located in the crosspoint switch 112 such that stream arrives at the correct destination.

Once a stream has arrived at a corresponding IP input port at the correct output card 106, the receiving output card 106 de-encapsulates one or more received streams to retrieve the content data contained within the packets and construct an output SDI signal 120 based on the retrieved content data. As noted previously, as each stream generated by an input card 104 may be separately routed through the midplane 102, the output SDI signal 120 generated by the output card 106 can conceivably include streams from entirely different input cards, but which were addressed (i.e., by the address inserting module 108) to the same destination. The SDI signal, generated by the output card 106, is then transmitted from an SDI output port in accordance with the destination address included, by the address inserting module 108, in each stream packet.

In various embodiments, each of the input cards 104 and the output cards 106 include field-programmable gate arrays (FPGAs). The FPGAs may be pre-programmed or pre-configured in some cases, and dynamically configurable by the controller 110 in some other cases. For example, in some cases, each of the input and output cards 104, 106 include integrated circuitry which is pre-configured to convert input SDI signals into one or more packetized streams (i.e., at the input card), and convert one or more packetized streams into output SDI signals. In at least some embodiments, the input and output cards 104, 106 are removably coupled to the midplane 102.

In various disclosed embodiments, the controller 110 is configured to control all operation of the SDI router through exclusive communication with the midplane 102, and in particular, communication with the address inserting module 108 and the crosspoint switch 122.

Accordingly, and in view of the foregoing, another advantage of the disclosed SDI router may be that the controller 110 does not control and/or manipulate the edge devices (i.e., the input and output cards). Rather, the controller 110 can control all routing through commands transmitted to the address inserting module 108, and crosspoint switch 112. In turn, the edge devices 104, 106 may be static, or otherwise off-the-shelf components, and do not otherwise require control or re-configuration in order to transmit or receive data packets. Further, the input and output cards 104, 106 may not be aware of the destination and/or source addresses for transmitted and/or received media stream packets, as this is all handled by the controller 108 through communication with the address inserting module 108. Consequently, inefficient, time costly and unreliable three-way handshake operations between packet transmitters and receivers may be avoided.

Referring now to FIG. 2, which shows an alternative embodiment of an SDI router 200. In this embodiment, as stated previously, each of the input and output cards are replaced by I/O cards 114. Accordingly, each I/O card 114 may be operable to perform the combined functions of the input cards 104 and output cards 106, as discussed herein. In this embodiment, an I/O card 114 may be an input card in some instances, and output card in some other instances. For example, each of the I/O cards 114 can be configured with integrated FPGA circuitry which can perform conversion between SDI signals and packetized media streams Reference is now made to FIGS. 3A to 3C, which illustrate various example embodiments of the input card 104 of the SDI router 100.

Figure 3A:
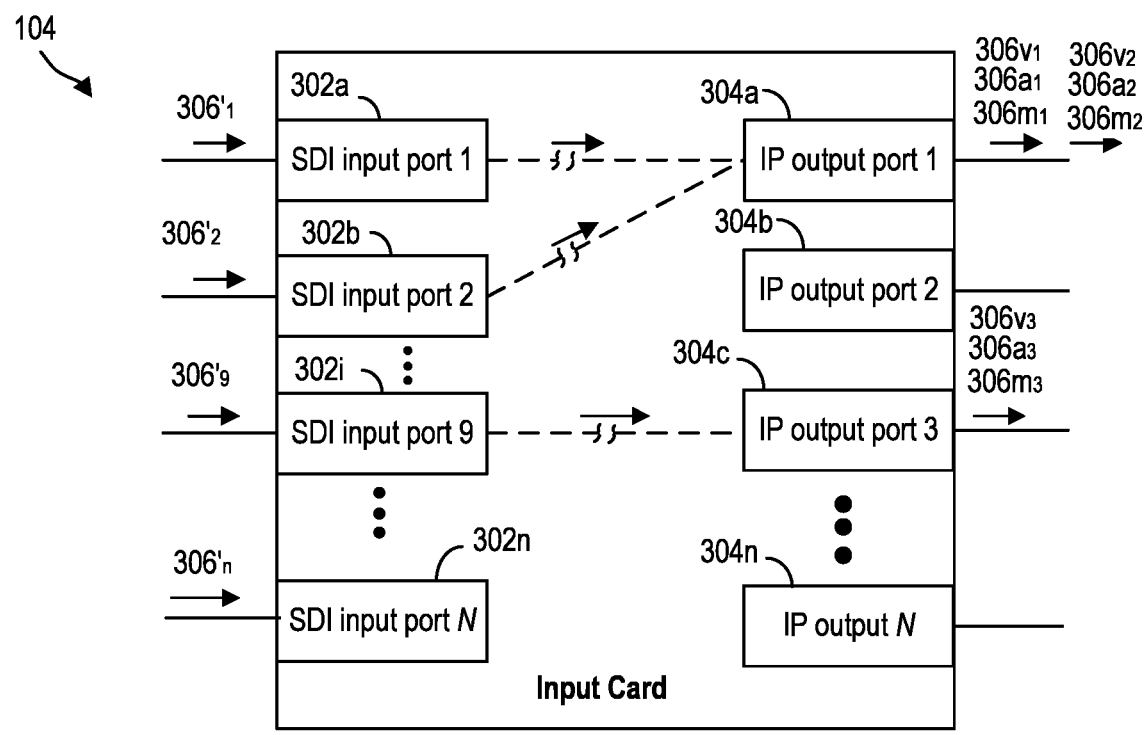
FIG. 3A is a block diagram of an input card associated with an SDI router in accordance with an example embodiment.

Referring first to FIG. 3A, which illustrates a simplified and high-level block diagram of an example input card 104.

As shown, each input card 104 generally includes one or more SDI input ports 302a-302n, and one or more IP output ports 304a-304n. Each SDI port 302 may be associated with a corresponding IP output port 304. That is, the input card 104 may be pre-configured (i.e., via the integrated circuitry) such that SDI signals received at specific SDI input ports 302 are output by specific IP output ports 304. For example—in the illustrated example embodiment—SDI signals received at SDI input port '1' 302a and SDI input port '2' 302b are output as packetized media streams from IP port '1' 304a. Similarly, SDI signals received at SDI input port '9' 302i may be output as packetized media streams from IP output port '3' 304c.

As illustrated, each SDI signal $306'_1$-$306'_n$ received at each SDI input port 302a-302n, may undergo various transformations and processing to generate the one or more output media streams at the corresponding IP output port 304. The processing and transformations to the received SDI signals is illustrated in FIG. 3A by broken lines coupling the SDI input ports 302 to the corresponding IP output ports 304.

In various cases, each SDI port 302 may be configured as a Bayonet Neill-Concelman (BNC) or small form-factor pluggable (SFP) connector. Each IP port 304 may be configured as, for example, a 25 gigabyte or 100 gigabyte ethernet link.

Figure 3B:
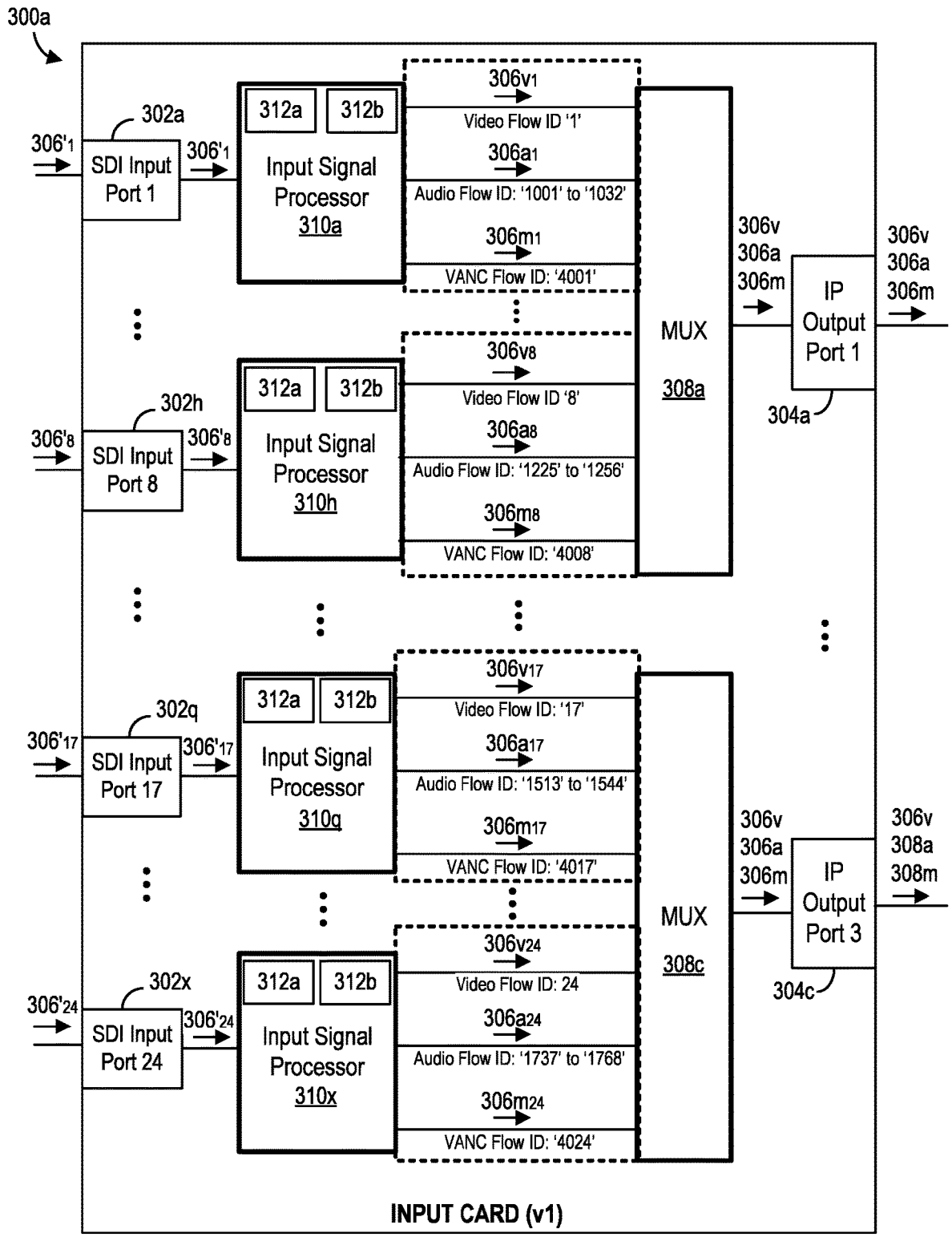
FIG. 3B is a block diagram of an input card associated with an SDI router in accordance with another example embodiment.

Referring now to FIG. 3B, which shows an example embodiment an input card 104a in greater detail, and in accordance with some embodiments. The input card 300 is analogous to the input cards 104 of FIG. 1.

As shown, the input card 104a includes the one or more SDI input ports 302 and the one or more IP output ports 304.

For ease of discussion, only SDI input ports 302a (i.e., SDI input port '1'), SDI input port 302h (i.e., SDI input port '8'), SDI input port 302q (i.e., SDI input port '17') and SDI input port 302x (i.e., SDI input port '24') have been illustrated, although any number of SDI input ports may be provided. Further, only IP output port 304a (i.e., IP input port '1') and IP output port 304c (i.e., IP output port '3') have been illustrated, although any number of IP ports 304 may also be provided.

In the illustrated example embodiment, each IP output port 304 is associated with eight SDI ports. For example, SDI ports '1' to '8' are linked (i.e., coupled) to IP port '1', such that SDI signals received from any one of SDI ports '1' to '8' are transmitted as packetized media streams from IP port '1'. Similarly, SDI ports '17' to '24' are linked (i.e., coupled) to IP port '3', such that SDI signals received from any one of SDI ports '17' to '24' are transmitted as packetized streams from IP port '3'. In other embodiments, however, any other coupling configuration between SDI and IP ports may be provided.

As shown—the input card 104a includes one or more input signal processor 310a-310x and one or more multiplexers 308a-308b interposed between the SDI and IP ports. In the illustrated embodiment, an input signal processor 310 is provided for each SDI input port 302, and a multiplexer is provided for each IP output port 304. However, the input signal processors 310 may be coupled to the SDI input ports 302 in a different manner, based on a different coupling configuration.

The operation of the input card 102 will now be explained using the SDI port 302a as an example. In the illustrated example, the SDI signal $306'_1$ is received at the SDI port '1' and is fed into the input signal processor 310a. Each signal processor 310 may include one or more processing modules, including a signal conversion module 312a and a derivative signal generating module 312b.

Signal conversion module 312a is operable to convert the received SDI signal $306'_1$ to generate one or more packetized media streams. More particularly, signal conversion module 310a may receive the SDI signal $306'_1$, and de-encapsulate the SDI signal $306'_1$ to extract one or more media components embedded in the SDI signal $306'_1$. For example, the signal conversion module 312a can extract one or more of the SDI video component, SDI audio component(s), and ancillary data component(s). As discussed above, in various cases, an SDI signal may include up to 16 or 32 audio channels, where each may be separated and converted into a corresponding packetized media stream. Similarly, multiple ancillary data components can be extracted (e.g., timecode, subtitles, etc.) and converted into one or more packetized media streams.

Once the media components have been de-encapsulated from the SDI signal, the signal conversion module 312a may transform each media component into a corresponding packetized media stream. That is, each media component may be transformed into a media stream that comprises a plurality of individual media packets, with each media packet carrying a payload corresponding to a portion of the extracted media content.

For example, as shown in FIG. 3B, each video component in the SDI signal 306' can be transformed into a packetized video stream 308v. Further, each audio channel may also be transformed into a corresponding audio stream 308a. While FIG. 3B illustrates only a single audio stream 308a generated by each input signal processor 310a, this has only been done for ease of discussion, and it will be appreciated that any number of audio streams 308a may be generated by the signal processor 310 corresponding to any number of extracted audio channels. Still further, the ancillary data components may be transformed into one or more packetized streams 306m.

Referring now briefly to FIGS. 6A-6D, which show example structures for packets that can be included in a packetized media stream generated by the signal conversion module 312a.

Figure 6A:
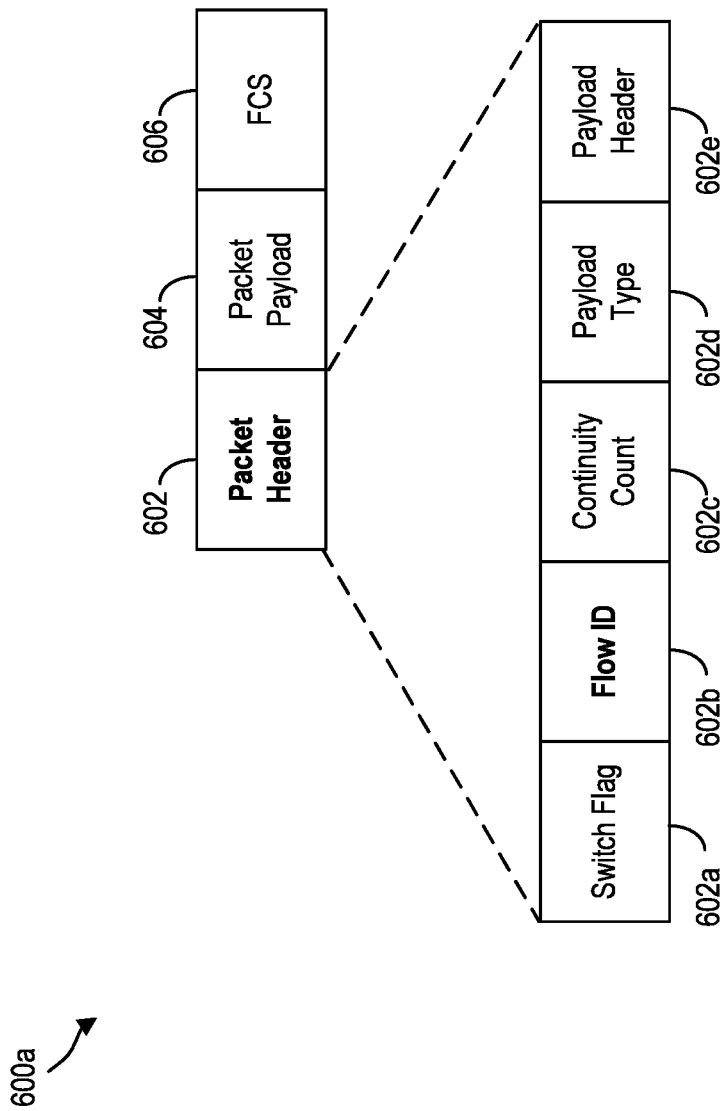
FIG. 6A is an example of a packet frame associated with a media stream in accordance with an example embodiment.

Referring first to FIG. 6A, which shows an example packet 600a that may be generated by the signal conversion module 312a in the input card 300a.

As shown, the packet 600a may comprise a modified ethernet frame having one or more data fields including, a packet header 602, a packet payload 604 and in some cases, a frame check sequence (FCS) field 606.

Packet payload 604 may carry data corresponding to the actual media content that is transmitted in the stream. For example, packet payload 604 may include at least a portion of the video content, audio content(s) and/or ancillary data content(s) that are generated from an SDI signal. In various cases, once the media content has been generated from an SDI signal, it may be divided into a plurality of portions, each portion being inserted into the packet payload 604 of a different packet frame 600a.

Packet header 602 may include various identifying information about the packet. In various cases, the packet header 602 can, itself, include multiple sub-data fields including, a switch flag 602a, a flow ID 602b, a continuity count 602c, a payload type 610d and a payload header 602e. In various cases, the packet header is a four (4) byte data element.

Considering each of the sub-data fields of the packet header 602, the switch flag 602a may be a binary data field that is initially set to '0'. As explained, the switch flag 602a may be modified by the address inserting module 108 (FIGS. 1, 2) during audio channel switching.

Flow ID 602b is a field that identifies the particular packetized stream generated by the signal conversion module 312a. In some cases, the flow ID 602b is related to the SDI port, at the input card 104, where the input SDI signal is received. In some other cases, the flow ID 602b is related to both the input card 104 and the input SDI port within the input card 104 where the input SDI signal is received. In some further cases, the flow ID 602b is related to the input card 104 and the input SDI port within the input card 104 where the input SDI signal is received as well as the IP port from where the corresponding packetized media streams are transmitted to the midplane.

As discussed below, the flow ID 602b is used by the address inserting module 108 to determine the source SDI port of the input card 104a, and accordingly determine a corresponding destination output card and SDI output port for the stream. To explain the flow ID 602b, reference is made briefly back to FIG. 3B, and with continued concurrent reference to FIG. 6A.

As illustrated, each of the input signal processors 310 may assign a flow ID 602b to a media stream packet based on the SDI input port 302 receiving the source SDI signal. For example—packets in the video stream $306v_1$ are assigned a flow ID of '1' to indicate that the video stream was generated from an SDI signal received at SDI port '1'. Similarly, packets in the video stream $306v_8$ are assigned a flow ID of '8', indicating that the video stream originated from an SDI signal at SDI port '8', and so forth for video streams $306v_{17}$ (received at SDI port 17) and $306v_{24}$ (received at SDI port 24).

Similarly, with respect to the audio streams, a range of flow IDs may be available where the flow IDs uniquely identify the SDI input port 302 where the corresponding input SDI signal is received. For example, packets in an audio stream $306a_1$ are assigned a flow ID in a range of '1001' to '1032' (i.e., a range of 32 different audio flow IDs). The range of audio flow IDs correspond to different audio channels (i.e., 32 channels) that can be generated from an SDI signal. That is, different audio channels extracted from an SDI signal can be assigned a unique flow ID selected from the range of '1001' to '1032'. Likewise, audio streams from SDI port '8' may be assigned flow IDs in a range of '1225' to '1256' (i.e., another range of 32 different audio flow IDs). Still further, audio streams from SDI port '17' may be assigned flow IDs in a range of '1513' to '1544', and audio streams from SDI port '24' may be assigned flow IDs in a range of '1737' to '1768'.

Similarly, the ancillary data streams (or the miscellaneous streams) may also be assigned different flow IDs 602b based on the input SDI port (i.e., '4001' for SDI port 1, '4008' for SDI port 8, '4017' for SDI port 17 and '4024' for SDI port 24).

Accordingly, in the example input card 300a of FIG. 3B, each of the flow IDs, for each type of stream, is unique across all SDI input ports 302. That is, no two streams, across all input ports of a same input card, have the same flow ID. Rather, in some cases, such as the illustrated case, the flow IDs (or flow ID ranges) increase incrementally with the increase in the input SDI port number.

In the embodiments of FIG. 6A, the source address corresponds to the information included in the routing ID field 602b.

Figure 3C:
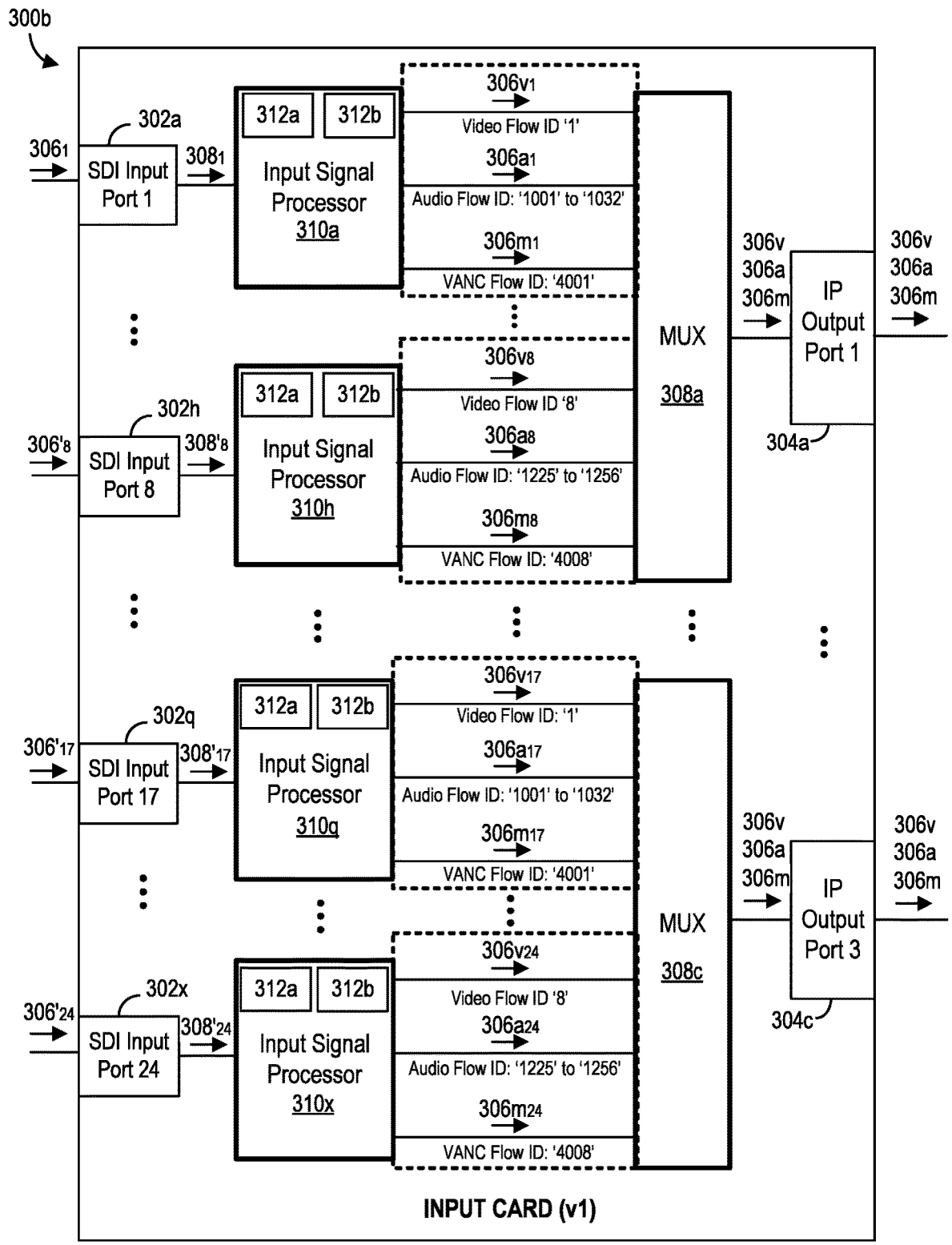
FIG. 3C is a block diagram of an input card associated with an SDI router in accordance with a further example embodiment.

FIG. 3C, however, shows another example embodiment for an input card 104b that uses a different scheme for allocating flow IDs to the packetized media streams. In the example of FIG. 3C, the flow IDs are recycled (or re-used) for different IP ports 304. In other words, a set of eight (8) SDI ports linked to the same IP output port are assigned unique flow IDs. However, the same flow IDs are recycled for the next set of eight (8) SDI ports 302 linked to the next IP output port 304. In such cases, the flow IDs may be uniquely related to the input card 104 and the input SDI port within the input card 104 where the input SDI signal is received as well as the IP port from where the corresponding packetized media streams are transmitted to the midplane. Accordingly, any scheme for assigning flow IDs based on SDI input port and/or output IP port may be used.

Referring back to FIG. 3B, each signal processor 310 may additionally include stream include a derivative signal generating module 312b. The derivative signal module 312b is configured to generate one or more derivative streams corresponding to the media content included in the input SDI signal 306. For example, the derivative signal module 312b may be configured to generate a sub-resolution video stream corresponding to the video content contained within the input SDI signal 306'. Similarly, the derivative signal module 312b may be configured to generate another processed version of the video content contained within the input SDI signal 306'. The derivative signal module 312b may also be configured to generate derivatives and/or processed versions of the audio and/or data content contained within the input SDI signal 306'.

In FIG. 3B, the derivative streams are broadly included in the miscellaneous stream $306_m$ generated by the signal conversion module 312a, which also includes the extracted ancillary data. Each derivative stream is identified by a separate flow ID.

Next, the packetized media streams 306, generated by each input signal processor 310, are received by a multiplexer 308.

In the illustrated embodiment, at least one multiplexer 308 is provided for each IP port 304. Accordingly, media streams 306, generated from SDI signals 306' received at SDI input ports '1' to '8', are received by a first multiplexer 308a (i.e., associated with IP port '1'). Further, media streams 306, generated from SDI signals received at SDI input ports '9' to '16', are received by a second multiplexer (i.e., associated with IP port '2') (not shown). Still further, media streams 306, generated from SDI signals received at SDI input ports '17' to '24', are received by a third multiplexer 308c (i.e., associated with IP port '3').

Each multiplexer 308a is configured to select one of the many packets corresponding to one or more media streams to transmit, at a given time instance, to the corresponding IP port 304. In this manner, the media streams are transmitted from the IP port 304, and to the midplane 102.

Figure 3D:
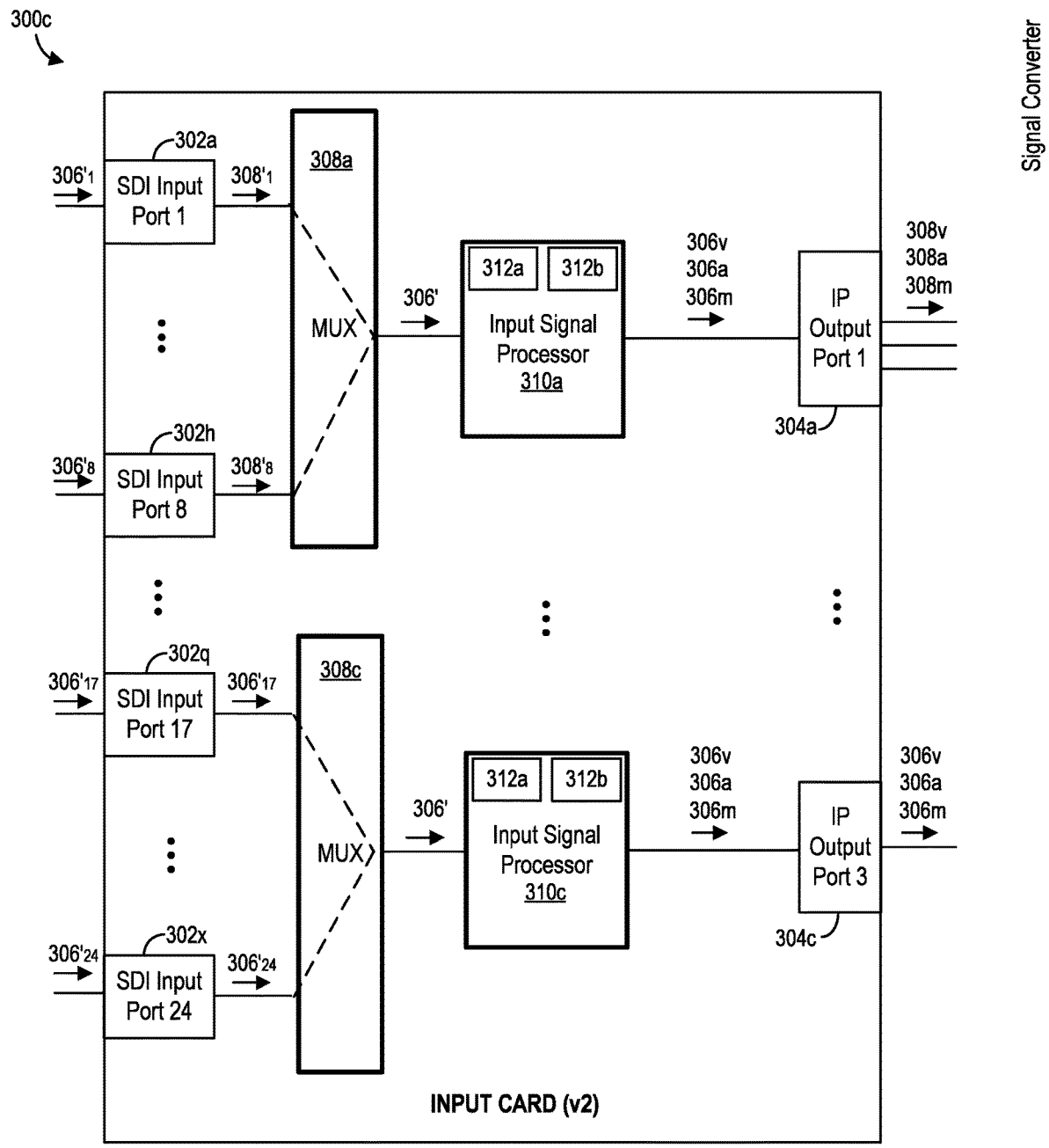
FIG. 3D a block diagram of an input card associated with an SDI router in accordance with another example embodiment.

Reference is now made to FIG. 3D, which shows another example embodiment of an input card 300c.

The input card 104c of FIG. 3D is generally analogous to the input card 104a of FIG. 3B, with the exception of the placement of the multiplexers 308 and the signal processors 310. In the embodiment of FIG. 3D, only a single multiplexer 308 and signal processor 310 is provided for each corresponding IP port 304.

In the embodiment of FIG. 3D, SDI input signals 306' are received from each SDI port 302, and are forwarded to the relevant multiplexer 308. Each multiplexer 308 selects one of the received input SDI signals 306' to feed into the signal processor 310 at a given time instance. The input signal processors 310 receive the SDI signals 306', and generate the one or more corresponding packetized streams 306 as explained previously. The streams 306v, 306a and/or 306m are then transmitted to the relevant IP port 304.

Referring back to FIG. 6A, the packet header 602 may also include a continuity count field 602c. The continuity count field 602c comprises a counter of the numbered packet order of a particular packet in the stream. For example, if a stream includes 64 packets, the continuity count field 602c can include the ordered number of the packet among the 64 packets. In various cases, the continuity count can assist the system in determining if, during transmission, packets were lost in the stream (i.e., a packet having a continuity count is missing). In other cases, the continuity count can also assist the packets in a stream to be re-assembled at an output card 106 in accordance with their numeric ordering.

Payload type 602d can provide an indication of the type of payload being carried by the packet (i.e., video, audio, ancillary data, derivative data, etc.).

Payload header 602e may be a data field that is filled where the payload, itself, has a payload header, otherwise this field may be set to '0'.

Each packet 600a may also include the FCS 606 field, which is a standardized field in ethernet frames that assists in determining whether the frame of data was corrupted during transmission.

Figure 6B:
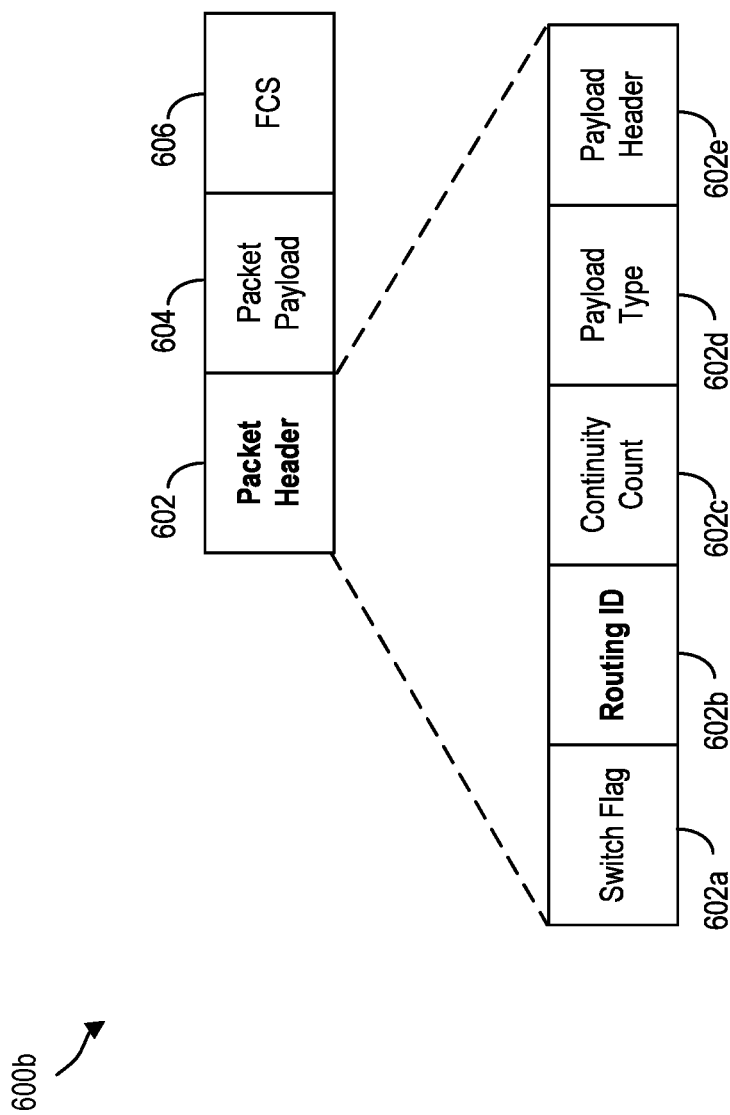
FIG. 6B is an example of a packet frame associated with a media stream in accordance with another example embodiment.

Referring now to FIG. 6B, which shows another example packet frame structure 600b that may be generated by the signal conversion module 312a of the signal processor 310 in the input card 300a.

Packet frame 600b is generally analogous to the packet frame 600a, but includes a routing ID field 602b in place of the flow ID field in packet 600a. In some cases, the routing ID field includes an indication of the input card which generates the packet, as well as the IP output port 304 (i.e., of the input card 104), which is transmitting the packet to the midplane 102. In some other cases, the routing ID field additionally includes an indication of the input SDI port within the input card where the corresponding SDI signal is received.

The routing ID field 602b also includes a flow ID uniquely identifying each packetized media stream generated from the input SDI signal. In cases where the routing ID identifies the input SDI port, as discussed above, the flow ID need not be related to the input SDI port. In other cases, where the routing ID does not identify the input SDI port, the flow ID is related to the input SDI port.

In the embodiments of FIG. 6B, the source address corresponds to the information included in the routing ID field 602b.

Figure 6C:
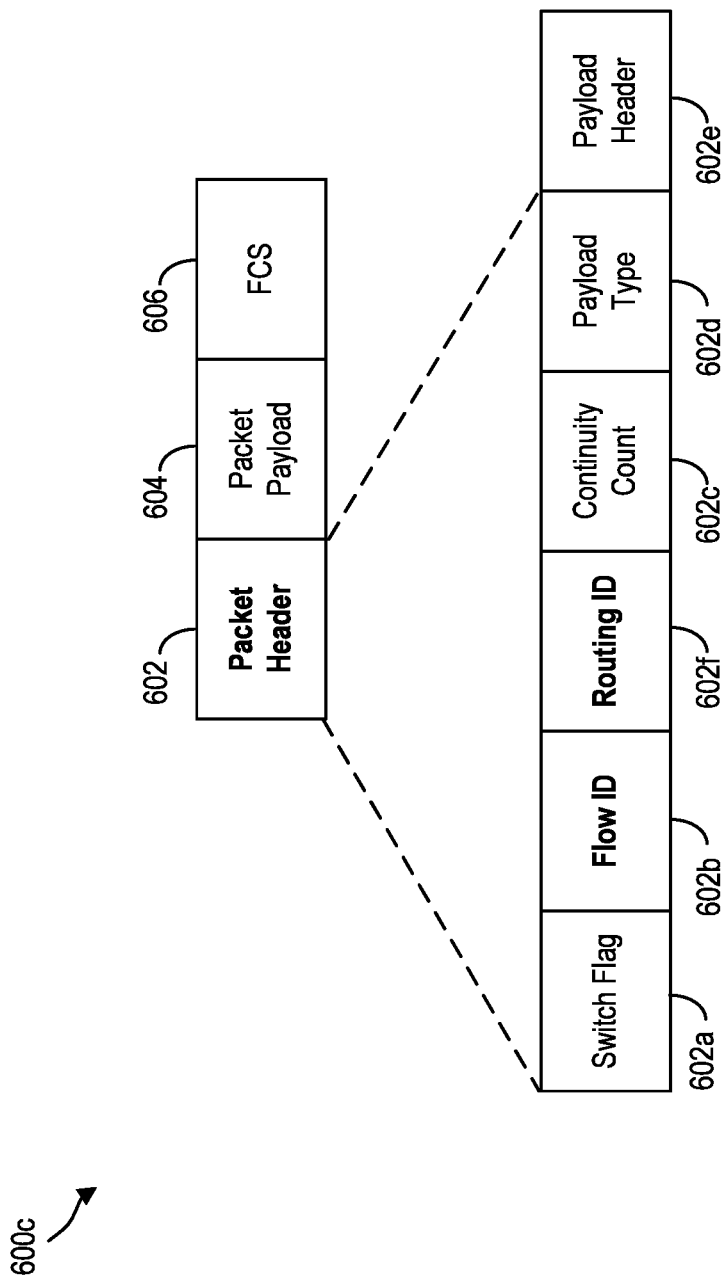
FIG. 6C is an example of a packet frame associated with a media stream in accordance with yet another example embodiment.

Referring now to FIG. 6C, which shows another example packet frame structure 600c that may be generated by the signal conversion module 312a of the signal processor 310 in the input card 300a.

Packet frame 600c is generally analogous to the packet frame 600b, except that the routing ID 602f is now provided separately from the flow ID 602b. In the embodiment of FIG. 6C, the source address corresponds to the information included in the flow ID field 602b and the routing ID field 602f.

Similar to the discussion above, the flow ID 602b may be a unique identifier for each packetized media stream, without any relationship with the source information, such as the input SDI card, input SDI port or output IP port from where the packetized media stream and/or the corresponding input SDI signal are received. In such cases, the routing ID 602f includes the relevant source identifying information. Similarly, in some other cases, the flow ID 602b either partially or fully identifies the source of the corresponding incoming SDI signal (e.g., the input card number and/or the input SDI port number), and in such cases, the routing ID 602f only identifies the output IP port number from which the packetized media stream is received.

In various embodiments, the flow ID 602b only uniquely identifies the packetized media stream without uniquely identifying the signal or packetized stream source information. In such embodiments, the signal or corresponding packetized stream source information is identified in the routing ID 602f. Accordingly, in such embodiments, when the address inserting module processes the incoming media stream packets to replace the source address with a destination address, as discussed in detail below, only the routing ID 602f is updated. In such embodiments, the routing ID 602f is updated to identify the destination address of the corresponding packet, where the destination address identifies the input IP port of an output SDI card and the output SDI card where the packetized stream needs to be routed, as well as the output SDI port from where the corresponding output SDI signal is transmitted.

Figure 6D:
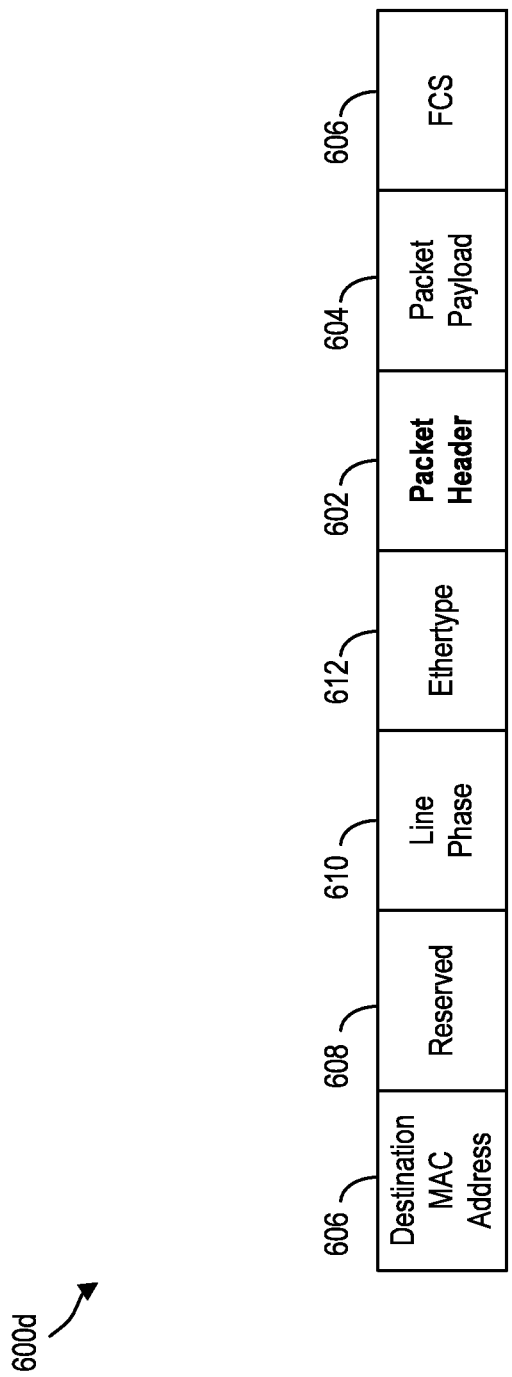
FIG. 6D is an example embodiment of a packet frame associated with a media stream in accordance with another example embodiment.

Referring now to FIG. 6D, which shows an example embodiment of a packet frame structure 600d that may be generated by the signal conversion module 312a of the signal processor 310 in the input card 300a.

The frame structure 600d is generally analogous to the frame structures 600a, 600b and 600c, but includes one or more additional data fields including a destination MAC address 606, a reserved field 608, a line phase field 610 and an ethertype field 612. In various cases, the destination MAC address and reserved fields are set to '0'.

Figure 4A:
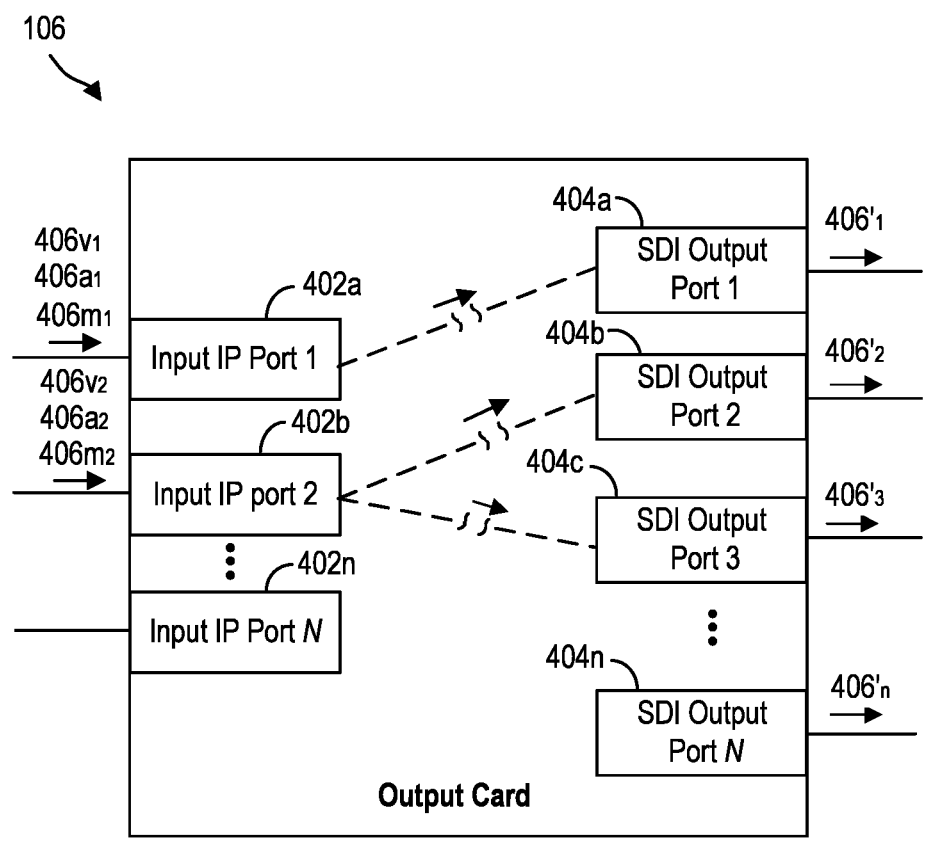
FIG. 4A is a block diagram of an output card associated with an SDI router in accordance with an example embodiment.
Figure 4B:
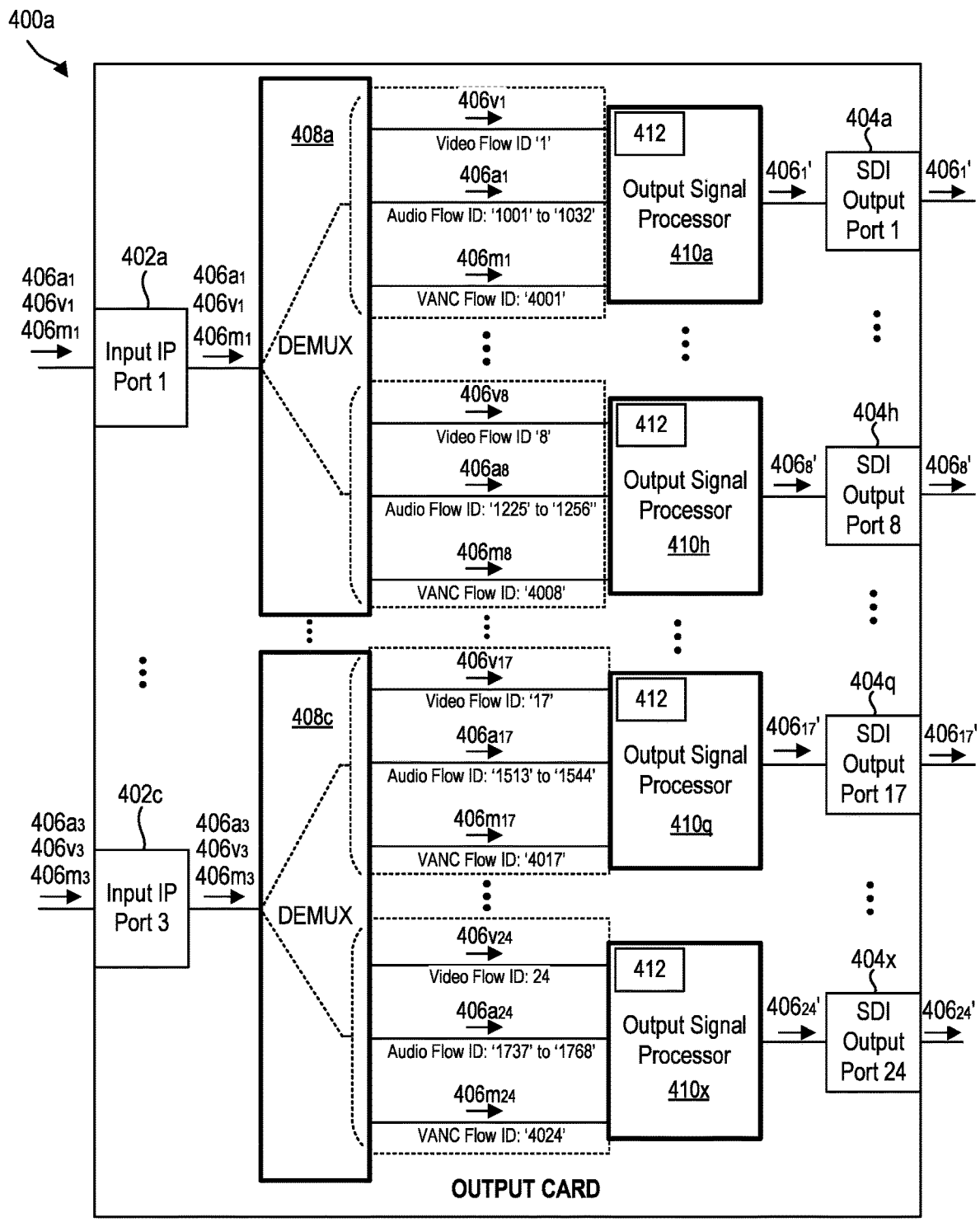
FIG. 4B is a block diagram of an output card associated with an SDI router in accordance with another example embodiment.
Figure 4C:
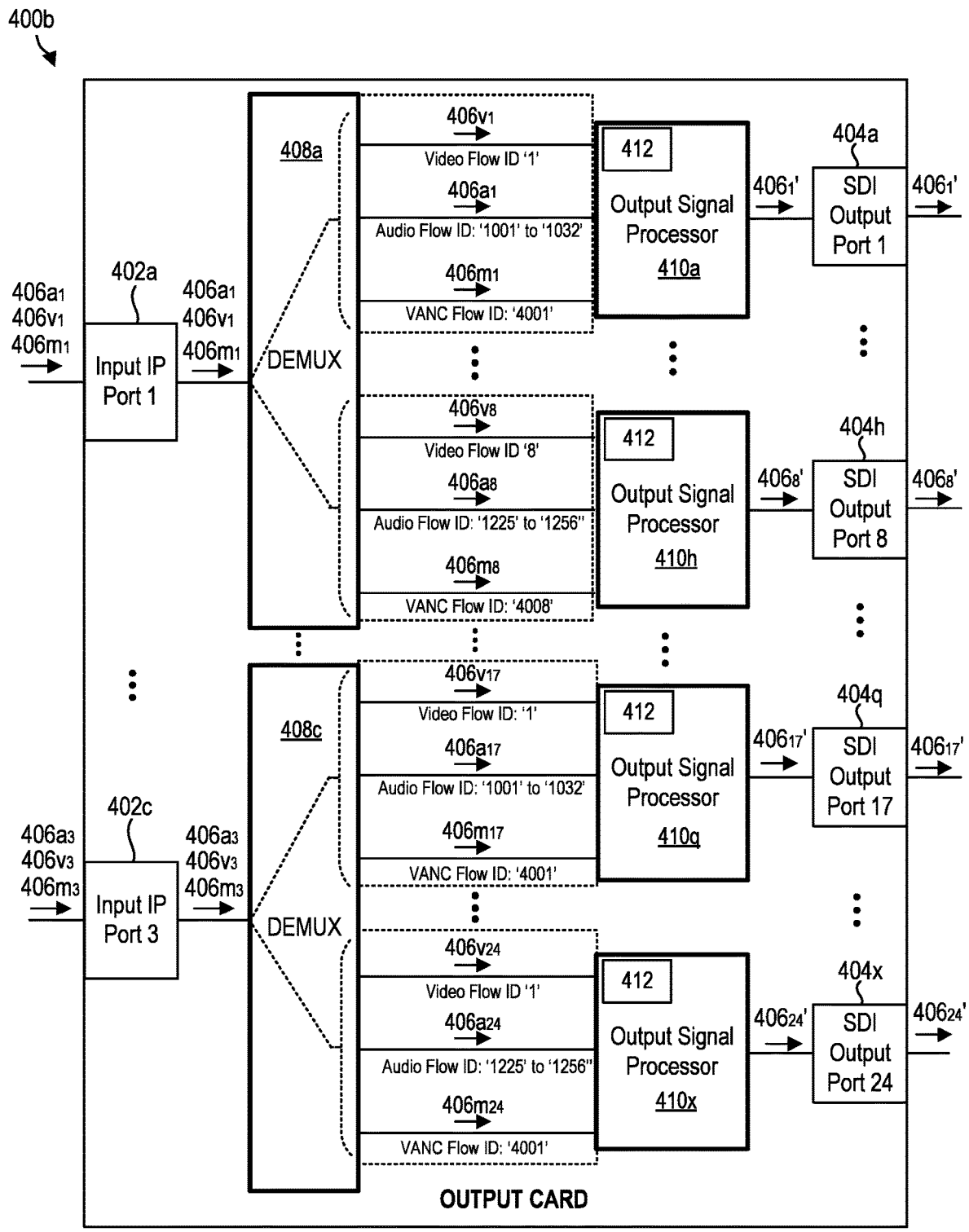
FIG. 4C is a block diagram of an output card associated with an SDI router in accordance with a further example embodiment.

Reference is now made to FIGS. 4A-4C, which show various example embodiments of output cards 106 that may be used in the SDI router 100 of FIG. 1.

Referring first to FIG. 4A, which illustrates a high-level simplified block diagram of an example embodiment of an output card 106.

As explained previously, the outputs card 106 are configured to receive media streams (i.e., video, audio and miscellaneous streams) that are routed to the output card 106 through the midplane 102. The output cards 106 are then operable to convert these streams back into output SDI signals that can then be transmitted to other downstream devices. Similar to the input card 104, the output cards 106 may be configured as FPGAs having integrated circuitry that is configured to perform the transformation of media streams into SDI signals.

As shown, the output card 106 may generally include one or more IP input ports 402a-402n, as well as one or more SDI output ports 404a-404n.

The input IP ports 402 are connected to the midplane 102 (FIG. 1), and are configured to receive packetized media streams that are routed thereto by the crosspoint switch 112. In various cases, each of the input IP ports 402 may be coupled to the midplane 102 by, for example, a 25 gigabyte or 100 gigabyte ethernet link. In various cases—each input IP port 402 may be configured to receive one or more media streams that are addressed to that particular IP port by the address inserting module 108. The crosspoint switch 112 may be configured to route specific streams to specific IP input ports 402 of specific output cards 106 based on destination address included into each stream packet by the address inserting module 108.

In the illustrated example—the input IP port 402a (i.e., port '1') may receive one or more of a video stream $406v_1$, audio streams $406a_1$ and miscellaneous streams $406m_1$. In other words—the input IP port 402a can receive any combination of video, audio and miscellaneous streams 406. Similarly, the input port 402b may receive one or more of a video stream $406v_2$, audio streams $406a_2$ and miscellaneous streams $406m_2$. The video, audio and miscellaneous streams received at the IP ports may be received within a close time range (i.e., a few milliseconds) such that may be encapsulated together into a single SDI output signal by the output card 106.

While only a single audio stream 406a is illustrated at each IP port 402 for ease of discussion, a plurality of audio streams may be received at a given IP port 402. For example, a plurality of audio streams 406a can be received at each IP port 402, each corresponding to a different audio channel. Similarly, while a single miscellaneous stream 406 is illustrated at each IP port 406m for ease of discussion, many miscellaneous streams 406 may be received, and may include ancillary data streams as well as various derivative data streams that may be generated by an input card 104.

In various cases, the video, audio and miscellaneous streams received at a particular IP port may be generated by different input cards 104 and/or based on different input SDI signals. In many cases, the SDI router 100 may be operable to route to the same IP port 402, at a given output card 106, video, audio and miscellaneous streams generated by separate input cards 102 and/or generated based on separate input SDI signals. For example, in some cases, at an output card 106, an output SDI signal encapsulate streams from varied sources is generated. This may be because each media stream may be independently routable through the midplane 102 to a destination card.

Referring still to FIG. 4A, each output card 106 also includes one or more SDI output ports 404a-404n. The SDI output ports 404 may include, for example, various BNC or SFP connectors that may allow the SDI output port to feed to various downstream devices (i.e., display devices, multi-viewers, etc.). Each SDI output port 404 may transmit a corresponding SDI signal 406' (i.e., $406'_1$-$406'_n$) that encapsulates one or more media streams received at a given IP port 402. Each SDI signal can encapsulate any combination of video, audio and miscellaneous streams 406, based on which streams were received at each input IP port 402.

As illustrated in FIG. 4A by way of broken lines, each of the input IP ports 402 may couple to a corresponding SDI output port 404. For example, input IP port 402a (i.e., IP port '1') may couple to the SDI output port 404a (i.e., SDI port '1'). Accordingly, streams $406v_1$, $406a_1$ and/or $406m_1$ received at the input IP port 402a may be converted into an SDI output signal $406'_1$ where the SDI output signal 406' is transmitted from the SDI output port 404a.

In at least some embodiments, a single input IP port may couple to more than one SDI output port. For example, the input IP port 402b (i.e., IP port '2') may couple to each of the SDI output port 404b (i.e., SDI port '2') and SDI output port 404c (i.e., SDI port '3'). Accordingly, media streams $406v_2$, $406a_2$ and/or $406m_2$ received at the input IP port 402b may be converted into SDI output signals, which are transmitted from either of SDI output port 404b or 404c. The SDI output port which receives the streams from the IP port 402b is determined based on the destination address contained in the received streams. In various cases, the coupling of particular IP ports 402 and particular SDI ports may be pre-configured into the of the output card's FPGA integrated circuitry.

In some cases, the number of input IP ports 402 provided in each output card 106 may be equal to or greater than the number of SDI output ports 404. In such cases, each input IP port 402 is configured to forward the incoming packetized media streams based on the destination address contained within the header of each packet within the incoming packetized media streams.

Referring now to FIG. 4B, which shows an example embodiment of an output card 106a in greater detail, and in accordance with some embodiments.

As shown, the architecture of the output cards 106 is the general inverse of the of the architecture of the input cards 104. Each of the output cards 106 includes one or more input IP ports 402, the one or more SDI output ports 404, as well as one or more demultiplexers 408 and one or more output signal processors 410.

In the simplified example illustrated in FIG. 4B, each input IP port 402 is coupled to eight (8) corresponding SDI output ports 404.

For example, the first input IP port 402a (i.e., IP port '1') feeds to each of SDI output ports 404a to 404h (i.e., IP ports '1' to '8'). Accordingly, packetized streams received at the input IP port 402a may be routed to one or more of the SDI output ports 404a to 404h based on the destination address included in the received stream packets, as determined by the address inserting module 108 in the midplane 102. Similarly, the output card 106a can include a second input IP port '2' that feeds to SDI output ports '9' to '16'. Still further, the third input IP port '3' may feed to SDI output ports '17' to '24', and so forth.

The coupling between IP and SDI ports illustrated in output card 106a is only provided by way of a non-limiting example. In some cases, each IP port 402 may be coupled to any number of SDI output ports 404. In the illustrated embodiment, each input IP port 402 in the output card 106a is coupled to an equal number of SDI output ports 404.

As further shown, media streams received at an input port 402 are directed to the demultiplexer 408. In the illustrated example embodiment, the output card 106a includes a demultiplexer 408 corresponding to each input IP port 402 (i.e., demultiplexers 408a-408c corresponding to input IP ports '1' to '3', respectively).

The function of each demultiplexer 408 is to internally "switch" (i.e., internally re-route) one or more received media flows streams from a corresponding IP port 402, to one of the SDI output ports 404 that are "coupled" to that input IP port (or more particularly, to switch the received media streams to circuitry associated with an SDI output port 404 that is coupled to that IP port 402).

For example, the demultiplexer 408a may receive one or more media streams from the input IP port 402a, and may switch the received media streams to circuitry associated with one of SDI output ports '1' to '8' (i.e., 404a to 404h), which are coupled to the input IP port 402a. Similarly, demultiplexer 408c may switch media streams received form input IP port 402c to one or more one of SDI output ports '17' to '24' (i.e., 404q to 404x).

In order to determine which SDI output port 404 should receive the media streams, each demultiplexer 408 may be configured to analyze the received media streams to determine the destination address included in that media stream. More particularly, the destination address, included in each packet of a media stream by the address inserting module 108, may include information specifying the SDI output port 406 which should receive the media streams 406.

In various cases, when a media stream is received at the address inserting module 108, the module 108 may replace the source flow ID (i.e., 602b in FIG. 6A) to correspond to a destination flow ID. The cross-switch 112 is then configured to route each packet, in a single stream, to the corresponding input IP port 402 for the relevant output card 106. In other cases, the address inserting module 108 may rewrite the relevant portion of the routing ID (i.e., 602b of FIG. 6B, 602f in FIG. 6C).

In some embodiments where the address inserting module 108 is configured to insert or replace the flow ID, the flow IDs may correspond to an SDI output port 404 in a specific output card 106. Within each output card 106, specific flow IDs may be assigned to specific output SDI ports 404 (i.e., analogous to the assignment of specific flow IDs to specific SDI input ports 202 at the input card 102). The assignment of the flow IDs to output SDI ports, for each output card 106, may be known before hand to the controller 110. In this manner, the address inserting module 108, receiving signals from the controller 110, may rewrite the flow ID to correspond to an SDI output port 404 at an output card 106.

In some cases, the addressing of flow IDs in the output card 400a may follow an analogous addressing scheme as the addressing of flow IDs in the input card 300a. That is, each SDI output port 404 may be assigned a unique flow ID, or a unique range of flow IDs.

For example, video streams having a flow ID of '1' may be intended for the SDI output port '1'. Similarly, the audio streams having a flow ID in a range of '1001' to '1032' (i.e., corresponding to one of 32 channels), or miscellaneous streams having a flow ID of '4001', may also be intended for the SDI output port '1'. Accordingly, when the demultiplexer 408a receives a stream having one of these flow IDs (i.e., streams $406v_1$, $406a_1$ and $406m_1$), it may automatically switch these streams to the circuitry associated with the SDI output port '1' (404a). In this manner, the demultiplexer 408a may have knowledge of which flow IDs (or flow IDs range) correspond to each SDI output port 404, and may analyze each streams for its flow ID and switch (i.e., internally re-route) to the corresponding SDI output port 404. A similar arrangement is also adopted for each other SDI output ports.

In various embodiments, each input IP port 402 may only receive, from the midplane 102, media streams having flow IDs for one or more of the SDI output ports 404 that are coupled to that input IP port.

For example, the input IP port '1' (402a) may only receive media streams having flow IDs corresponding to one or more of SDI output ports '1' to '8'. For instance, the controller 110 (FIG. 1) may be configured with knowledge of the SDI input ports 404 associated with each input IP port 402 for each output card 106, and may configure the address inserting module 108 and the crosspoint switch 112 to route the streams to the appropriate input IP port 402 at the correct output card 106. In this manner, the router avoids routing to the input IP port 402 (and the corresponding de-multiplexer 408) media streams having flow IDs that are outside the range of SDI output ports 404 associated with that input IP port 402.

In other embodiments, where the media stream packets are structed as shown in packet frame 600b of FIG. 6B, the demultiplexer may switch incoming media streams to corresponding SDI output ports 404 based on analyzing the flow ID in the routing ID field 602b. In still further embodiments, the where the media stream packets are structed as shown in packet frame 600c of FIG. 6C, the demultiplexer may switch incoming media streams to corresponding SDI output ports 404 based on analyzing the routing ID field 602f.

In some embodiments, rather than providing separate de-multiplexers 408 in the output card 106a for each input IP port 402, a single de-multiplexer 408 may be provided for all input IP ports 402. In this case, the demultiplexer 408 may be operable to switch incoming media streams to the appropriate SDI output port circuitry in accordance with addressing information included in those stream packets. In still other cases, any number of de-multiplexers 408 may be provided and associated with any number of input IP ports 402.

As shown in FIG. 4B, once the media streams are routed to the corresponding SDI output port circuitry (i.e., by the demultiplexer 408), the media streams are received by a corresponding output signal processor 410. In the illustrated example, the output card 106a includes an output signal processor 410 corresponding to each SDI output port 404.

Each output signal processor 410 may include an associated stream conversion module 412. The stream conversion module 412 is configured to receive one or more associated media streams 406 that are intended for the associated SDI port, and convert these media streams into one or more SDI signals 406'.

For example, the output signal processor 410a may receive one or more of a video stream $406v_1$, one or more audio streams $406a_1$ and one or more miscellaneous streams $406m_1$ and may encapsulate these streams into a corresponding SDI output stream $406'_1$. A similar process may be performed by each of output signal processors 410b-410x.

Once encapsulated, the SDI streams 406' may then be transmitted forward through the corresponding SDI output port 404.

Referring now to FIG. 4C, which shows another example embodiment of an output card 400b, in accordance with some other embodiments. The output card 400b is analogous to the output card 106 of FIG. 1.

The output card 400b is generally analogous to the output card 106a in FIG. 4B, with the exception that a different destination addressing scheme is used to associate streams to SDI outports 404.

Similar to the input card 300b of FIG. 3C, the flow IDs assigned to each SDI output port 404 are not unique across all SDI output ports 404 in the output card 106. Rather, the flow IDs are recycled as between SDI output ports associated with different input IP ports 402.

For example, in the output card 400b, the video flow IDs assigned to SDI output ports '1' to '8' are unique because the SDI output ports '1' to '8' are all associated with the same input IP port '1' (e.g., video flows IDS '1' to '8'). However, the video flow IDs are recycled again for SDI output ports '17' to '24' (i.e., also assigned video flow IDs '1' to '8'), as these SDI output ports are associated with a different input IP port '3'. A similar format is used for each of the audio and miscellaneous flow IDs. In other cases, the flow ID portion of the routing ID 602b in FIG. 6B and 602c in FIG. 6C, may be recycled as between SDI ports 404 associated with different input IP ports.

Figure 4D:
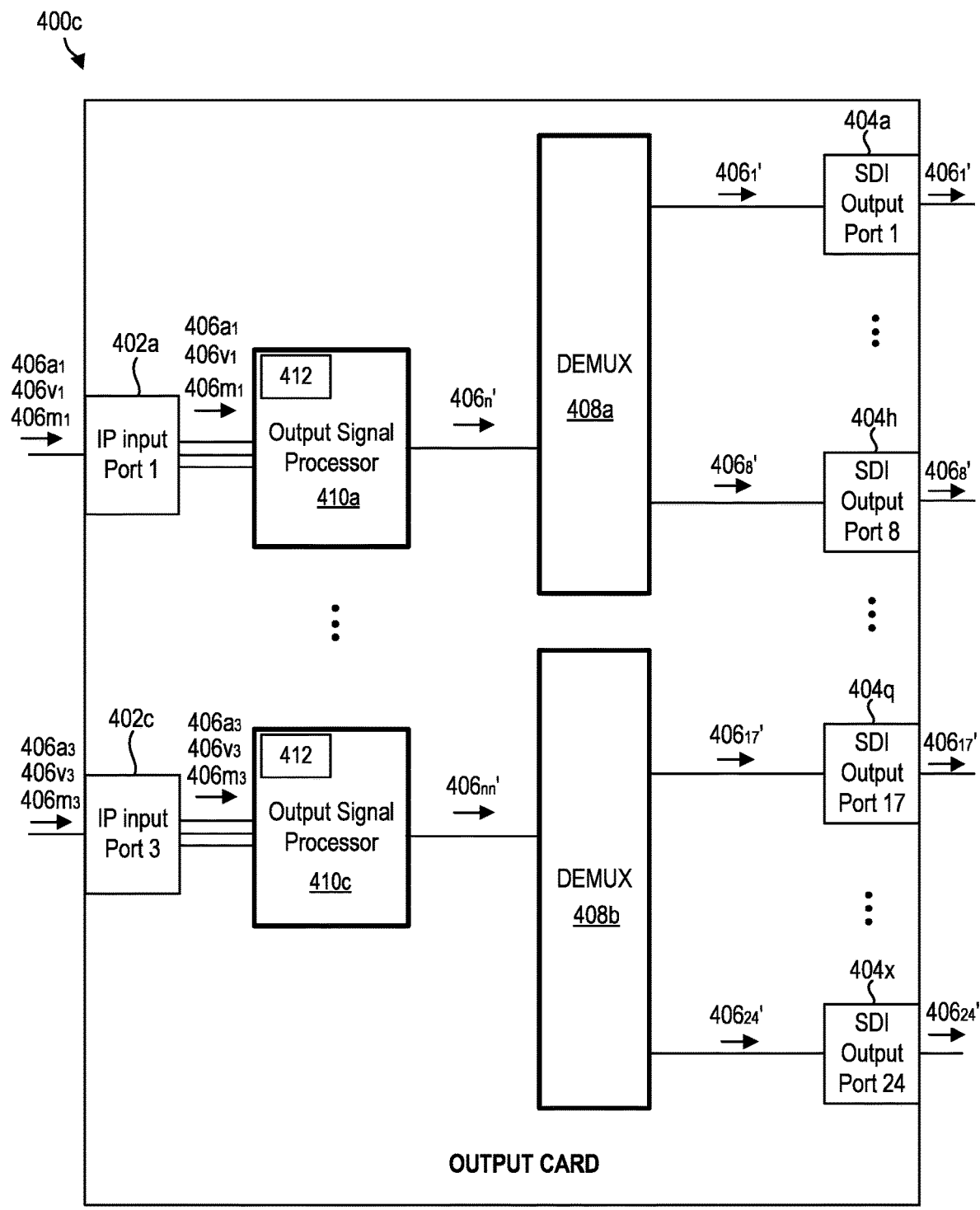
FIG. 4D is a block diagram of an output card associated with an SDI router in accordance with a further example embodiment.

Referring now to FIG. 4D, which shows another example embodiment of an output card 400c. The output card 400c is analogous to the output card 106 of FIG. 1.

Output card 400c is generally analogous to each of the output cards 400a and 400b, except for the locations of the output signal processor 410 and the demultiplexer 408.

In the output card 400c, an output signal processor 410 is provided in association with each input IP port 402 (e.g., processor 410a for input IP port 402a, and processor 420c for input IP port 402c, etc.). Accordingly, media streams 406 received at an IP input port 402 are initially transmitted to the corresponding output signal processor 410. The stream conversion module 412—inside the output signal processor 410—may then de-encapsulate the media streams 406 to generate a corresponding output SDI signal 406'.

For example, processor 410a can output an SDI signal $406_n'$, wherein the subscript 'n' can correspond to a value of '1' to '8' (i.e., corresponding to one of SDI output ports '1' to '8'). Similarly, processor 410c can output an SDI signal $406_{nn}'$, wherein the subscript 'nn' can correspond to a value of '17' to '24' (i.e., corresponding to one of SDI output ports '17' to '24'). The output SDI signals 406' are then transmitted to the demultiplexer 408.

In some embodiments, each stream conversion module 412 extracts the flow ID from each media stream (i.e., video, audio and miscellaneous streams). The stream conversion module 412c then identifies all the packets containing the same destination address). The stream conversion module 412c extracts the content data from all such packets and constructs an output SDI signal 406' based on the extracted content datastream. For example, in some cases, the stream conversion module 412c identifies all the packets containing the flow IDs that are assigned to a common SDI port 404 (e.g. from the routing ID field 602f in FIG. 6C). In this manner, the stream conversion modules 412 can ensure that related media streams—intended for the same SDI output port 404—are included in the same output SDI signal 406'. In various embodiments, the SDI port identifier information, as extracted from the packets (e.g. packet header) is also transmitted to the demultiplexers 408 (not shown).

As shown, the output card 106c can include a single demultiplexer 408a per IP input port 402. For example, a demultiplexer 408a can be associated with IP input port 402a, and demultiplexer 408c can be associated with IP input port 402c. The demultiplexers 408 may receive the SDI output signal 406' from each output signal processor 410—as well as the extracted indication about the receiving SDI port—and may switch (i.e., internally route) the SDI output signal to the correct SDI output port 404. The SDI output signals 406' may then be transmitted from the SDI output ports 404 to other downstream devices. In other cases, any number of demultiplexers 408 may be provided, and in association with any number of IP input ports 402.

Figure 5A:
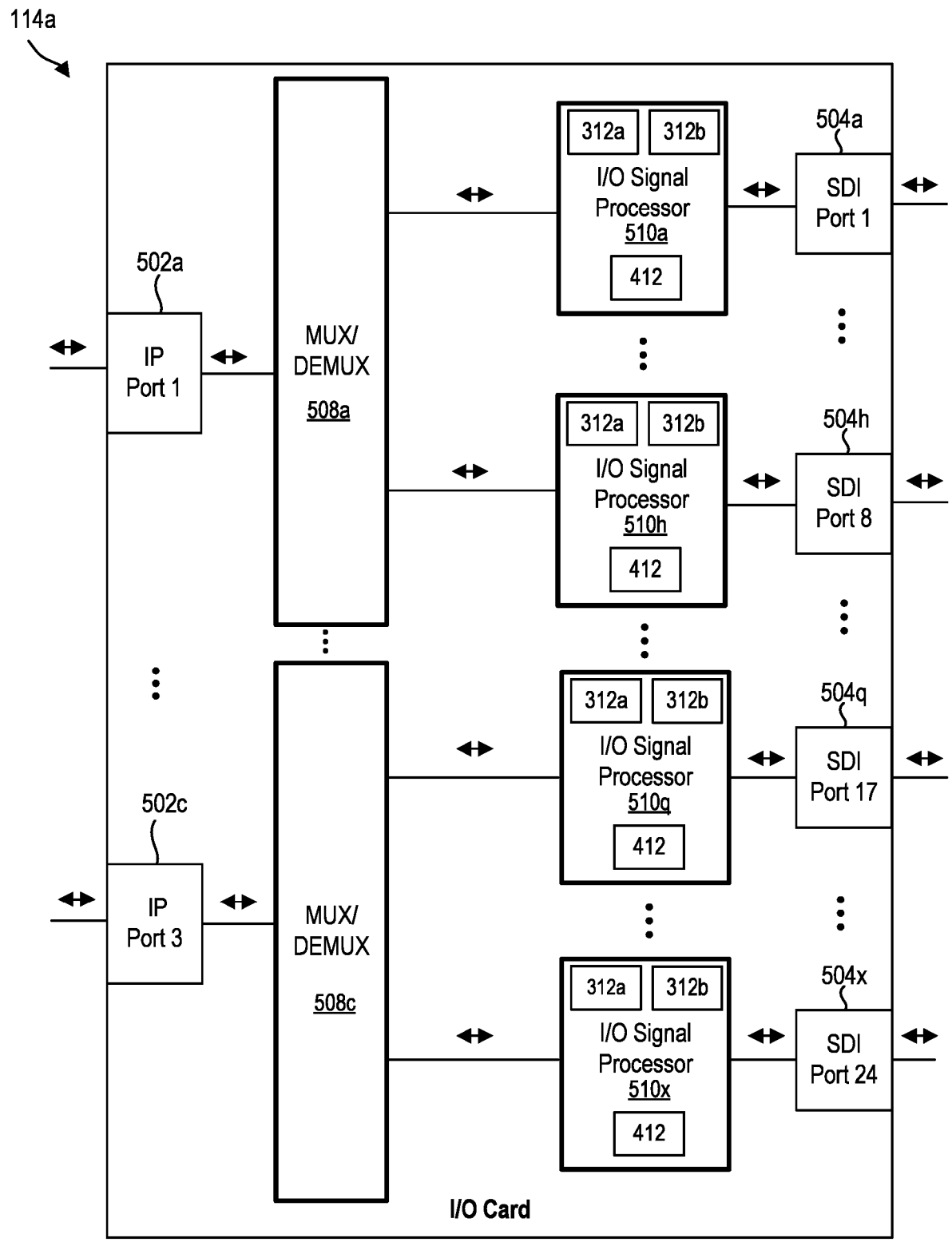
FIG. 5A is block diagram of an input/output (I/O) card used in an SDI router in accordance with an example embodiment.
Figure 5B:
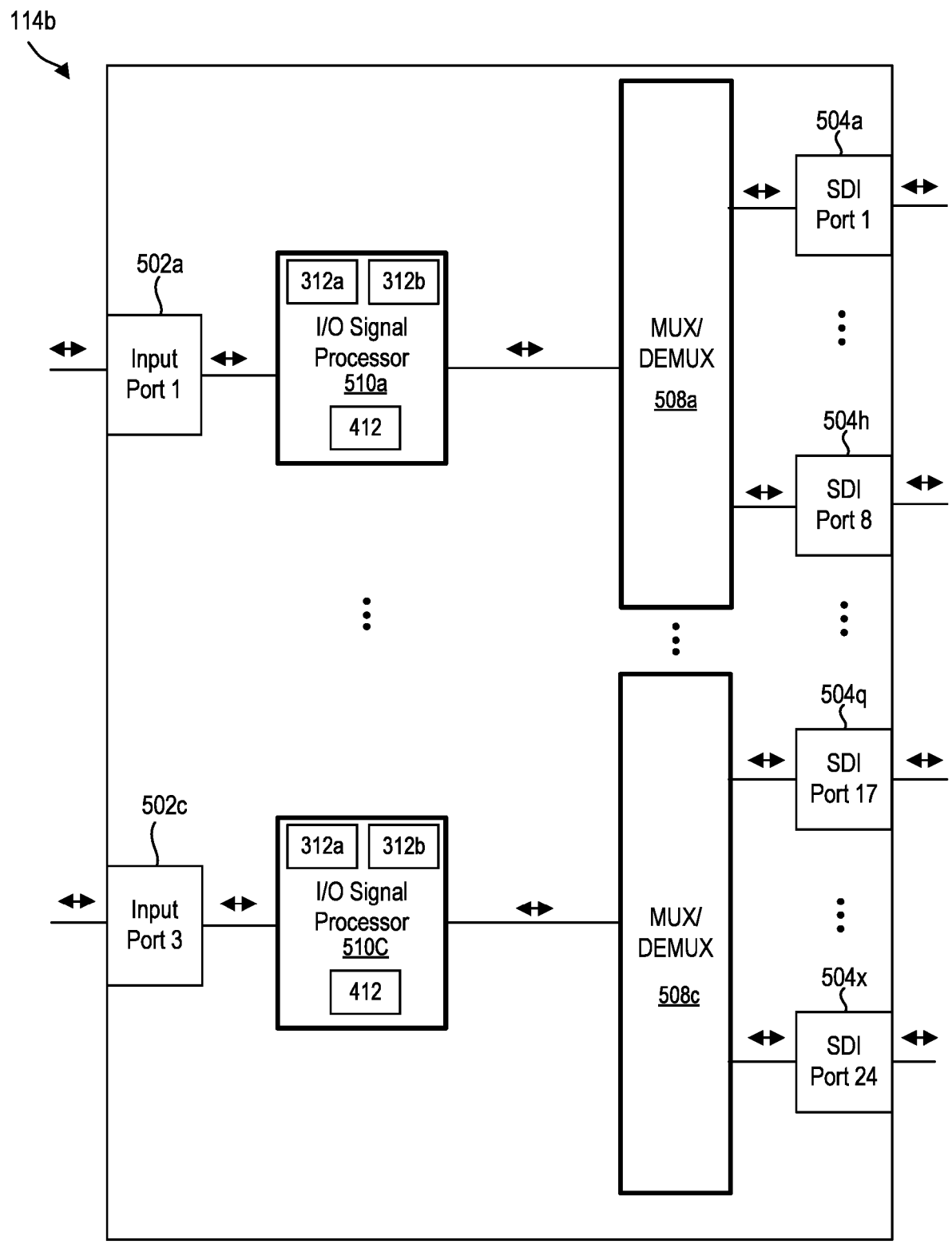
FIG. 5B is a block diagram of an input/output (I/O) card used in an SDI router in accordance with another example embodiment.

Reference is now made to FIGS. 5A-5B, which illustrate various example embodiments of an input/output (I/O) card 114 as used in the SDI router 200 of FIG. 2.

The I/O cards 114 incorporate the functionality of each of the input cards 104 and output cards 106 and allow for bi-directional SDI to packetized media stream conversions.

As shown, each I/O card may generally include one or more input IP ports 502 coupled to one or more SDI ports 504. Interposed between the IP ports 502 and the SDI ports 504 may be one or more multiplexers/de-multiplexers 508 and I/O signal processors 510. In the embodiment of FIG. 5A, the I/O input card 114a includes a mux/demux 508 corresponding to each IP port 502, and an I/O signal processor 510 corresponding to each SDI port 504. In the illustrated embodiment, the number of mux/demux modules 508 is equal to the number of IP ports 502 in each I/O card 114, and the number of I/O signal processors 510 is equal to the number of SDI ports 504 in each I/O card 114.

In the embodiment of FIG. 5B, the I/O card 114b includes mux/demux modules 508 and an I/O signal processors 510 corresponding to each IP port 502. In this embodiment, the number of mux/demux modules 508 and the number of I/O signal processors 510 is equal to the number of IP ports 502 in each I/O card 114.

As shown, each I/O signal processor 510 incorporates the functionalities of the input signal processor 310 of the input cards, which includes a signal conversion module 312a and/or a derivative stream generating module 312b. Additionally, each I/O signal processor 510 incorporates the functionality of the output signal processor 410, which includes a stream conversion module 412.

Similarly, each mux/demux module 508 includes the functionalities of the multiplexers and demultiplexers of both the input and output cards. The operation of each I/O signal processor 510, as well as the mux/demux 508 may depend on the directional flow of data through the I/O card 114.

While the input cards 104, output cards 106 and I/O cards 114 have been shown herein with multiplexers, demultiplexers or mux/demux—these components may not always be necessarily included. For example, in some cases, one or more IP ports and SDI ports in a card may be directly linked together (i.e., a one-to-one link), in which cases, it is not necessary for signals to be routed through a switch (i.e., a mux, demux, or mux/demux).

Figure 7A:
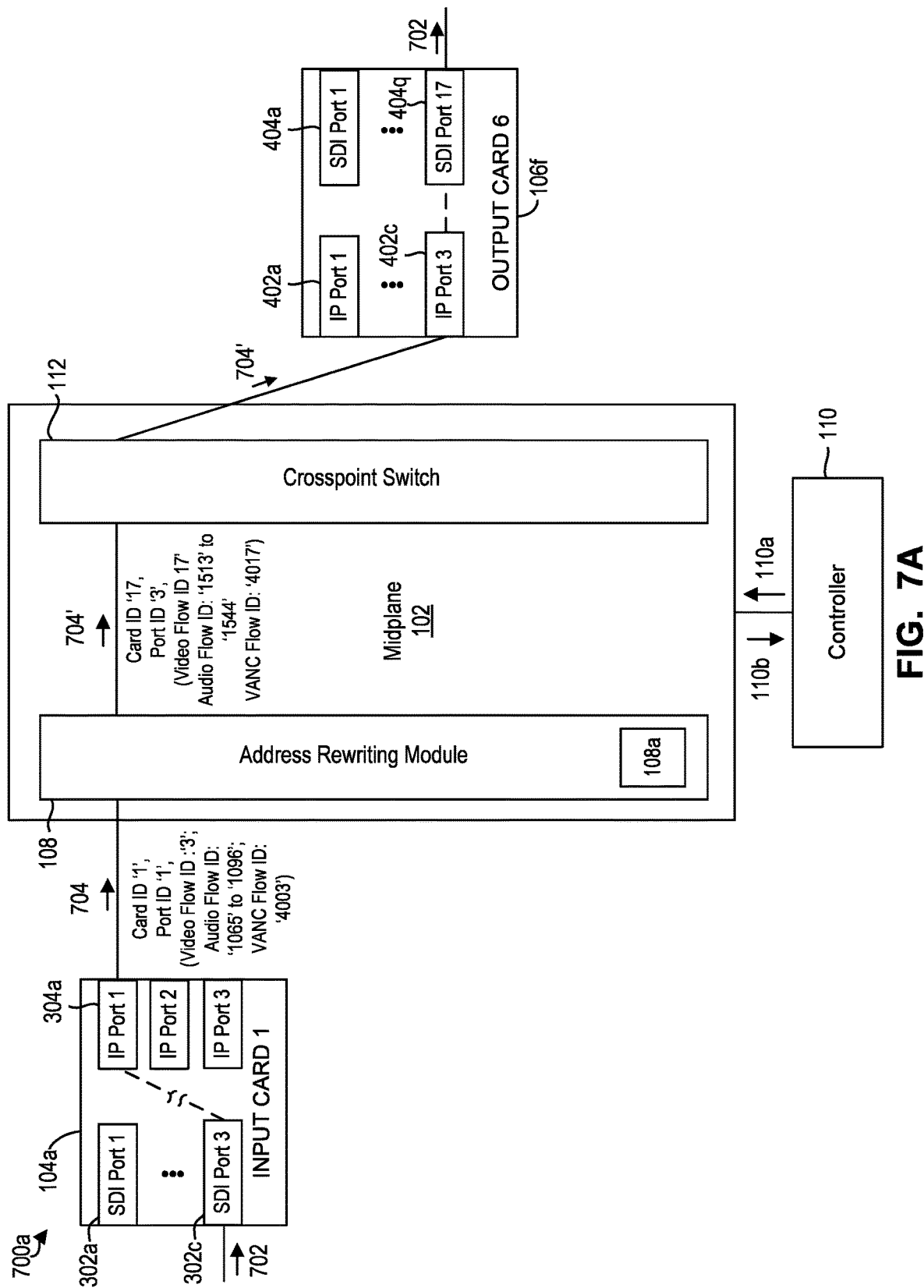
FIG. 7A is a flowchart illustrating an example method of operating an SDI router in accordance with an example embodiment.
Figure 7B:
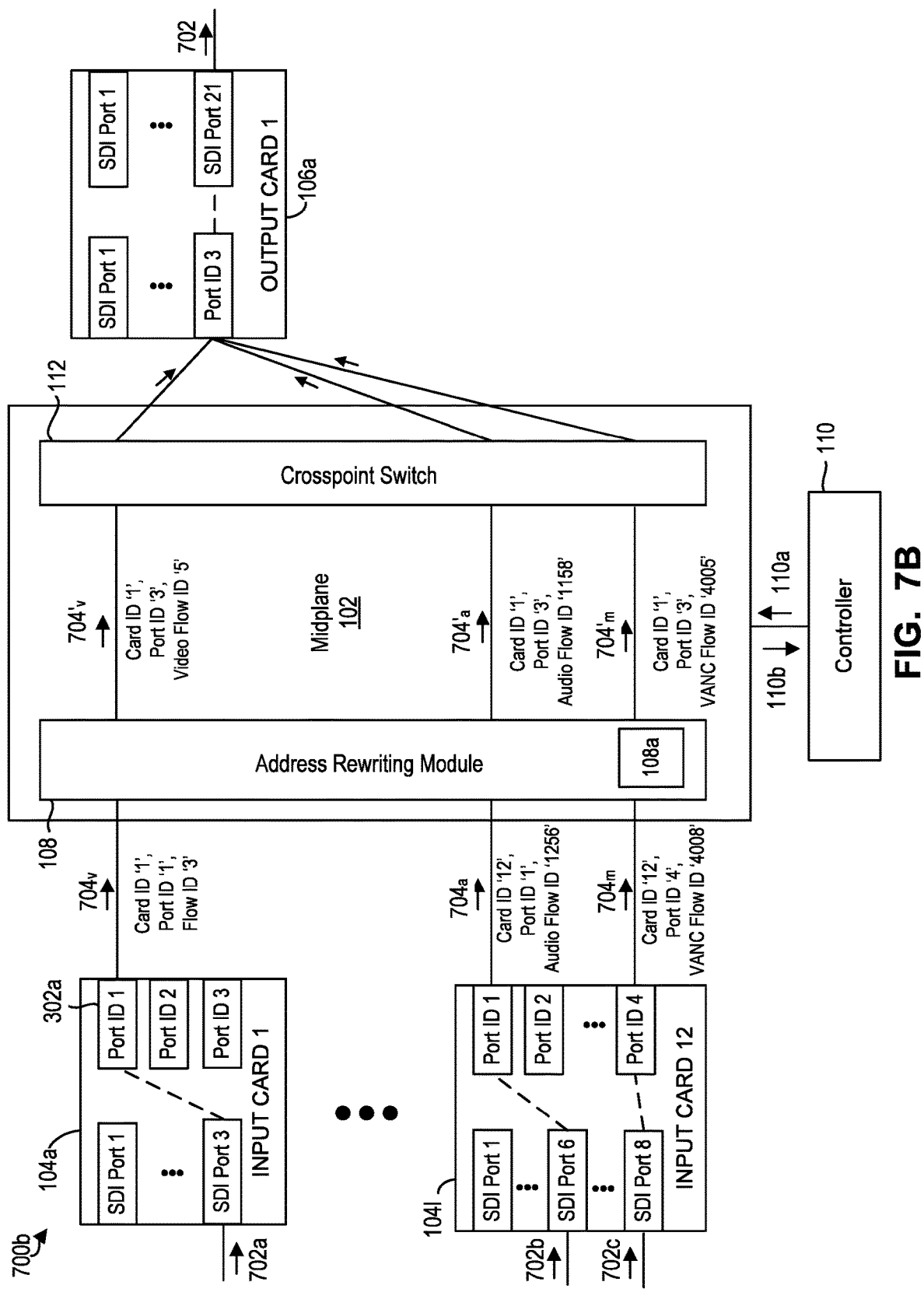
FIG. 7B is a flowchart illustrating an example method of operating an SDI router in accordance with another example embodiment.

Reference is now made to FIGS. 7A-7B, which show various example embodiments of SDI routers in operation.

Referring first to FIG. 7A, which shows an example operation of an SDI router 700a. The SDI router 700a may be analogous to the SDI router 100 of FIG. 1, and may include one or more input cards 104 and one or more output cards 106. For ease of description, only a single input card and output card is illustrated.

The input card 104a of FIGS. 7A and 7B may be any input card discussed herein, such as, for example, input card 300a-300c (FIGS. 3B-3D). The output card 106f of FIGS. 7A and 7B may be any output card discussed herein, such as, for example, output card 400a-400c (FIGS. 4B-4D).

FIG. 7A illustrates a simple example where a single SDI signal is routed through the SDI router 700a. As shown, an SDI signal 702 is received at the input card 104a (i.e., input card '1') and is routed to an output card 106f (i.e., output card '6'). The output card 106f may then transmit the SDI signal 702' to any downstream devices.

As shown, the SDI signal 702 is received at an SDI port '3' 302c of the input card 104a. In the illustrated embodiment, the input card 104a is configured such that each set of eight (8) SDI ports 302 are linked to a unique IP output port 304. As shown, SDI port '3' is linked to IP output port '1' (304a).

The input card 104a is operable to convert the received SDI signal 702 into one or more packetized media streams. In FIG. 7A, a packetized media stream, generated from the SDI signal 702 by an input signal processor, such as the input signal processor 310, is expressed as reference 704. Packetized media stream 704 may be an audio stream, a video stream, a data stream, a derivative stream corresponding to a derivative signal of one or more of the original audio, video or data contained within the SDI signal 702, or any other stream containing at least some of the content contained within the SDI signal 702.

The input card 104a is also operable to assign a source address to the packetized media streams generated from the SDI signal 702. Based on the addressing scheme used by the router 700a, the source address may be any one of the source address formats discussed in this application.

As shown in FIGS. 6A-6C, the source address is included in the packet header 602 of each packet constituting the packetized media stream 704. In some cases, where the frame structure 600a of FIG. 6A is used within the router 700a, the source address consists of a flow ID included in the packet header, such as flow ID 602b. In the illustrated embodiment, the flow ID identifies the source SDI port where the corresponding input SDI signal is received, such as the source SDI port '3' 302c. In such cases, if the packetized media stream 704 is a video stream, then the flow ID assigned to the packets of the video stream 704 may be '3' (indicating that the corresponding SDI signal was received at SDI port '3'). Similarly, if the packetized media stream 704 is an audio stream, then the flow ID assigned to the packets of the audio stream 704 may be in the range of '1065' to '1096', based on the audio channel constituting the packetized media stream 704. Similarly, if the packetized media stream 704 is a data stream, then the flow ID assigned to the packets of the data stream 704 may be '4003'.

Accordingly, an appropriate flow ID is inserted into each packet of a given packetized media stream based on the type of media carried in the packet payload. For a given media stream, each packet of that stream is assigned the identical flow ID. For example, each packet of a video stream, generated from the same SDI signal 702, is designated the same flow ID, and similarly each packet in each separate audio stream and miscellaneous streams are assigned the same respective flow ID.

In some other cases, where the router 700a uses the frame structure 600b in FIG. 6B, the routing ID field is updated to include the flow ID, as discussed above, as well as source identifying information, such as the source input card identifier and the output IP port identifier. For example, in the embodiment of FIG. 7A, the routing ID may include the flow ID, as well as an indication that the media stream is generated from input card '3' (i.e., input card ID: '3'), and is transmitted into the midplane by an IP port '1' (i.e., IP output port ID: '1').

In some further cases, where the router 700a uses the frame structure 600c of FIG. 6C, the routing ID may additionally include, compared to frame structure 600b, a source SDI input port ID identifying the SDI input port where the corresponding SDI signal is received. In such cases, the flow ID may be unrelated to the SDI ports, and may instead be any unique identifier able to uniquely identify each packetized media stream generated from the input SDI signal. In such cases, the source address consists of the flow ID and the routing ID.

The input signal processor, such as the input signal processor 310, of the input card 104a, also populates the remaining fields in each packet frame of each packetized media stream.

Next, the packetized media stream 704 generated by the input card 104a is transmitted to the midplane 102. At the midplane 102, the media stream 704 is received by the address inserting module 108. In various cases, packets from multiple packetized media streams are concurrently transmitted from an IP port 304 to the midplane 102.

At the midplane 102, the address inserting module 108 receives the packetized media stream 704 and, for each packet, analyzes the source address included in the packet header. The address inserting module 108 then determines a corresponding destination address for these packets. In various embodiments, the destination address for each packet is determined based on address inserting rules, which may be either stored in the address inserting module 108 (i.e., in a memory portion of the module 108) or provided by the controller 110 via control instructions 110a in real-time. The address inserting rules may be stored or accessed in the form of a table, e.g. a look-up-table. The address inserting rules, stored in the address inserting module 108, is updated by the controller 110, via control signals 110a, based on factors, such as changes in downstream content requirements, inoperability of certain output cards and/or output ports, etc.

In various cases, the address inserting rules provided by the control signal 110a may be known to the controller 110 based on the controller's global "awareness" of which devices are connected to which SDI ports of the input and output cards, and therefore, which media streams are routed between which SDI ports. In some example cases, this information may be provided to the controller 110 through external means (i.e., through computers in communication with the controller 110).

The address inserting module 108 accesses the address inserting rules to determine destination addresses for each packet of each media stream. The address inserting module 108 may then substitute, or otherwise append, the destination address in each packet.

The address inserting module 108 may be configured to write the destination address in the packet headers based on the addressing scheme used within the module 108. The addressing scheme may be pre-programmed, or dynamically changeable by the controller 110.

In some cases, where the packet frame structure 600a (FIG. 6A) is used within the incoming packetized media stream, the source flow ID is replaced with the destination flow ID. That is, while the flow ID field 602b was previously populated by the input card 104 to correspond to a flow ID associated with the source SDI port 302; the address inserting module 108 replaces that flow ID to correspond to a destination flow ID corresponding to an output SDI port 402 of an output card 106 where the packetized media stream is routed. The destination flow ID will depend on the flow ID scheme used by the destination output card 106, and may be known in advanced to the controller 110.

In the example embodiment of FIG. 7A, the output card 106f may be analogous to the output card 400a of FIG. 4B. Accordingly, the SDI port '17' may be associated with a video flow ID of '17'; an audio flow ID range of '1513' to '1544' (i.e., depending on the audio channel); and a data flow ID of '4017'. Accordingly, based on the type of media stream, the address inserting module can substitute the flow ID field 602b with the appropriate destination flow ID.

In other cases, where the incoming media stream packets adopt a frame structure 600b as shown in FIG. 6B, the address inserting module 108 substitutes the source routing ID with the destination routing ID in the field 602b of the packet header. In the illustrated embodiment, the source routing ID, identifying the input card ID (i.e., input card ID: '1') 104a, the IP input port ID 304a (i.e., Port ID: '1') and the source flow ID, is replaced with destination routing ID, identifying the output card ID (i.e., output card ID: '6'), the IP port ID 402c of the output card 106f (i.e., Port ID '3') and the destination flow ID.

In some further cases, where the media stream packets adopt a frame structure 600c as shown in FIG. 6C, the address inserting module 108 substitutes the routing ID field 602f to include a destination routing ID, identifying the output card ID (i.e., output card ID: '6'), the IP port ID 402c of the output card 106f (i.e., Port ID '3') and the output SDI port ID 404q (i.e., output SDI port ID: '17') for the output card 106. In such cases, depending on the addressing scheme selected by the controller 110, the flow ID field 502b may or may not change. For example, in some cases, where the source flow ID is unrelated to the source identifying information, e.g. SDI card ID and/or SDI port ID of the input card, the source and destination flow ID may be identical. In some other cases, even when the source flow ID is unrelated to the source identifying information, the source flow ID is replaced with the destination flow ID, which uniquely identifies the packetized media stream, and its constituent packets, being routed to the destination.

In at least some cases, the address inserting module 108 may have before-hand knowledge of the frame structure used by each input card and output card. In some cases, this information may be provided to the address inserting module 108 by the controller 110, which has a global awareness of how each input card and output card operates. In some cases, where the input cards 104 and the output cards 106 use different packet structures, the address inserting module 108 may be configured to modify the incoming packets to include a packet structure (i.e., a packet header format) that corresponds to the output card. In various cases, all input and output cards within a router may be configured to use the same packet structures.

In some cases, packets of the same packetized media stream are routed to multiple destinations. In such cases, the address inserting module 108 also includes a stream reproduction module 108a. The stream reproduction module 108a is configured to reproduce the content (e.g. payload) of the packetized media stream and encapsulate the packets in a separate packetized media stream or streams, each of which can be routed to a destination, independent of its corresponding original packetized media stream.

As shown, the packets of the readdressed media stream 704' is transmitted by the address inserting module 108 to the crosspoint switch 112. The crosspoint switch 112 routes the incoming packets to the appropriate IP port 402 of the correct output card 106 based on the destination address in the packet header.

In some cases, controller 110 may be configured to receive information signals 110b from the crosspoint switch 112. For example, the routing fabric in the crosspoint switch 112 may be configured as a software defined network (SDN), and the controller 110 may receive various status indicators (i.e., traffic load information) for routing nodes in the SDN based crosspoint switch 112.

Once the crosspoint switch 112 has routed the media stream packets to the appropriate output card 106f, the output card may convert the media streams back into SDI signals. In some cases, an output signal processor of the output card may de-encapsulate the incoming packets, retrieve the underlying content data and combine the content data into an output SDI signal, such as signal 702'. The output SDI signal 702' is transmitted from the appropriate SDI output port 404q.

Reference is next made to FIG. 7B, which shows the example operation of an SDI router 700*b*. The SDI router 700*b* is analogous to the SDI router 700*a* of FIG. 7A.

The SDI router 700*b* provides an example application where the output SDI signal 702', transmitted from the output card 106, is composed of media streams generated by separate input cards 104, such as input cards 104*a* and 104*l*, and separate input SDI signals received at the same input card 104, such as input SDI signals 702*b* and 702*c* at the same input card 104*l*.

As shown, a first input SDI signal 702*a* is received at the SDI port '3' of input card '1' (i.e., 104*a*), and is processed to generate a video stream 704*v*. Further, a second SDI signal 702*b* is received at an SDI port '6' of the input card '12' (i.e., 104*l*) and is processed to generate an audio stream 704*a*. Similarly, a third SDI signal 702*c* is received an SDI port '8' of the input card '12', and is processed to generate an ancillary data stream 704*m*.

At the address inserting module 108, each packetized media stream, received from the corresponding input cards, is configured with the same destination address. In the illustrated embodiment, the source addresses contained in packetized media streams 704*v*, 704*a* and 704*m* are replaced with the same destination address corresponding to an SDI port '21' on an output card '1' (i.e., 106*a*). The output card 106*a* may use a similar flow ID numbering scheme as shown in the output card 400*b* of FIG. 4C, whereby flow IDs corresponding to SDI output ports are recycled for each group of SDI output ports 404 linked to a common IP input port 402.

Each readdressed media stream 704'*v*, 704'*a*, and 704'*m* is then separately routed through the crosspoint switch 112 to the IP port '3' of output card 1. At the output card 106*a*, the media streams are de-encapsulated and the corresponding content is retrieved and combined to generate an output SDI signal 702'. The output SDI signal 702' is transmitted from the SDI port '21' of the output card 106*a*.

Figure 8A:
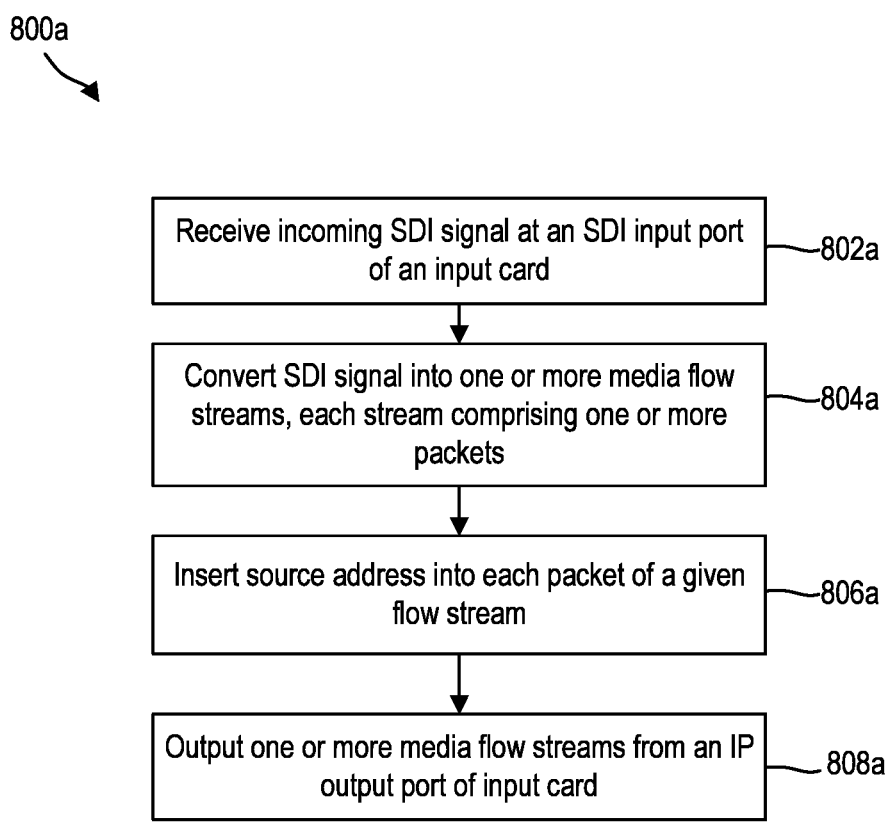
FIG. 8A is a flowchart illustrating an example method of operating an input card of an SDI router in accordance with an example embodiment.
Figure 8B:
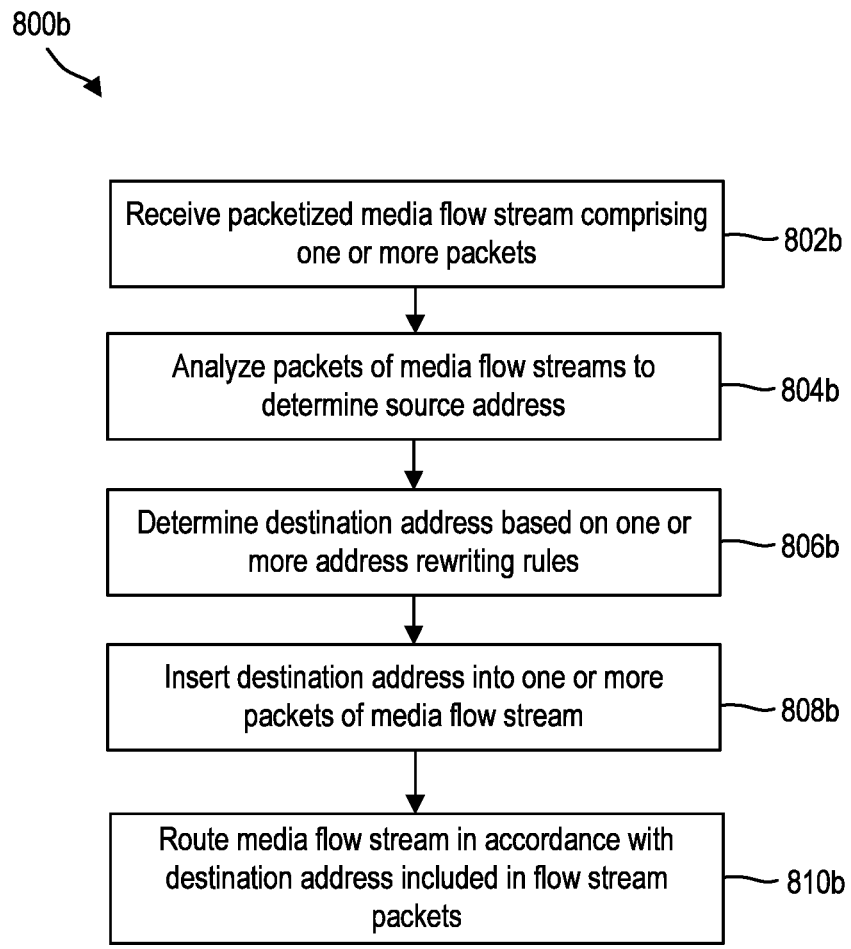
FIG. 8B is a flowchart illustrating an example method of operating a midplane of an SDI router in accordance with an example embodiment.
Figure 8C:
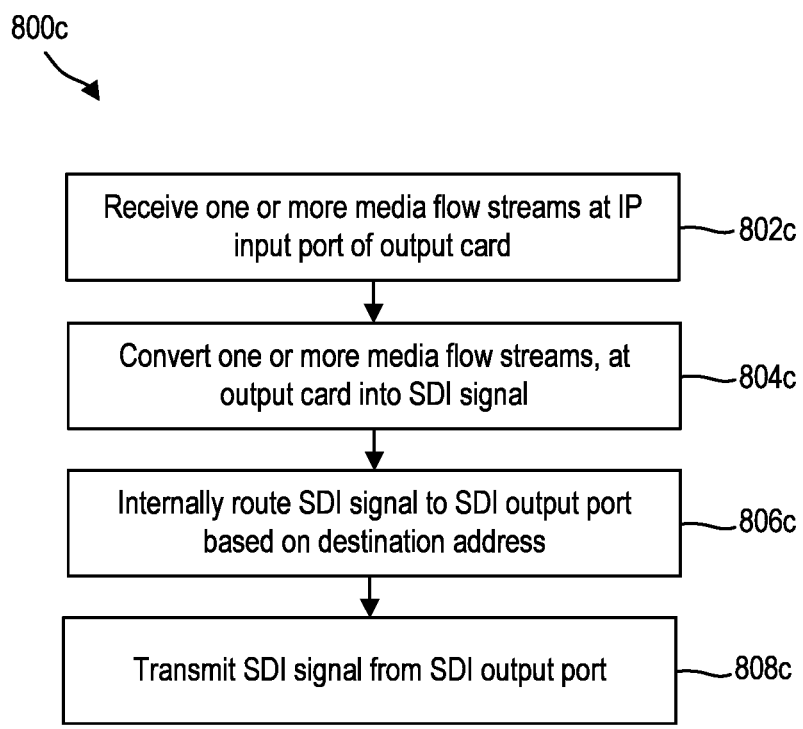
FIG. 8C is a flowchart illustrating an example method of operating an output card of an SDI router in accordance with an example embodiment.

Reference is now made to FIGS. 8A-8C, which illustrate various example embodiments for method for operating an SDI router.

Referring first to FIG. 8A, which shows an example embodiment of a method 800*a* for operating an input card 104.

As shown, at 802*a*, an input card 104 receives an input SDI signal at an SDI input port, such as SDI input port 302 of input card 104.

At 804*a*, the SDI signal is converted into one or more media streams based on the media content included in that SDI signal. For example, multiple media streams such as a video stream, one or more audio streams (i.e., corresponding to separate audio channels) and one or more miscellaneous streams (i.e., ancillary data) may be generated from the same input SDI signal. In some cases, the input card 104 can also generate one or more derivative streams from the same input SDI signal. The derivative stream may be a processed version of the video, audio and/or data content corresponding to the input SDI signal.

At 806*a*, source addresses are inserted into each packet of a given media stream. As explained previously, the source addresses can be expressed in accordance with various addressing schemed disclosed herein, such as, for example, packet formats of FIGS. 6A-6C.

At 808*a*, the input card 104 transmits the one or more generated media streams from an IP output port, such as IP output port 304, of the input card 104. The packets of the one or more generated media streams are transmitted to the midplane 102. In some cases, each input card 104 may be a stand-alone unit, and can be used to output generated media streams to any other device connected to the input card via the input card's IP output ports 304.

Referring now to FIG. 8B, which shows an example embodiment of a method 800*b* for operating a midplane 102.

As shown, at 802*b*, the midplane 102 receives one or more packetized media streams (e.g., video, audio or miscellaneous media streams) at an input node of the midplane 102. In various cases, the media streams may be received from one or more output IP ports 304 of input cards 102.

At 804*b*, the packets of the media streams are analyzed to determine the source address include in each packet. In various embodiments, the packets are analyzed by the address inserting module 108 of the midplane 102.

At 806*b*, the address inserting module 108 of the midplane 102 determines a destination address for each of the packets in the incoming media streams. In various embodiments, the destination address is determined based on one or more address inserting rules. The address inserting rules may be stored locally at the address inserting module 108 in some cases, and received from the controller 110 in real-time in some other cases.

At 808*b*, the address inserting module 108 replaces the source address in each packet header with the destination address for the packets. For example, one or more data fields in the packet header (i.e., the flow ID or routing ID) may be re-written, or appended, with the destination address.

At 810*b*, the modified media stream packets (or readdressed media stream packets) are routed by the crosspoint switch 112 in accordance with the destination address included in each packet header. The packets are routed by crosspoint switch 112 to a destination input IP port, such as input IP port 402, of a destination output card 106.

In accordance with method 800*b*, the midplane 102 may operate as a stand-alone structure which may be connected to any transmitter or receiver of packetized media streams, which may not always necessarily be the input cards, output cards or I/O cards.

Referring now to FIG. 8C, which shows an example embodiment of a method 800*c* for operating an output card 106.

As shown, at 802*c*, the output card 106 receives packets corresponding to one or more packetized media streams at an input IP port 404 of an output card 106. In various embodiments, the media streams are received form the midplane 102.

At 804*c*, the output card 106 transforms the one or more media streams into an SDI signal.

At 806*c*, the SDI signal is routed to an appropriate SDI output port based on the destination address included in the incoming media stream packets.

At 808*c*, the SDI signal is transmitted from the proper SDI output port (i.e., to downstream devices).

In accordance with method 800*c*, the output card 106 may also operate as a stand-alone structure which may receive packetized media streams and generate output SDI signals. The output card 106 may or may not be used with the midplane 102.

Figure 9A:
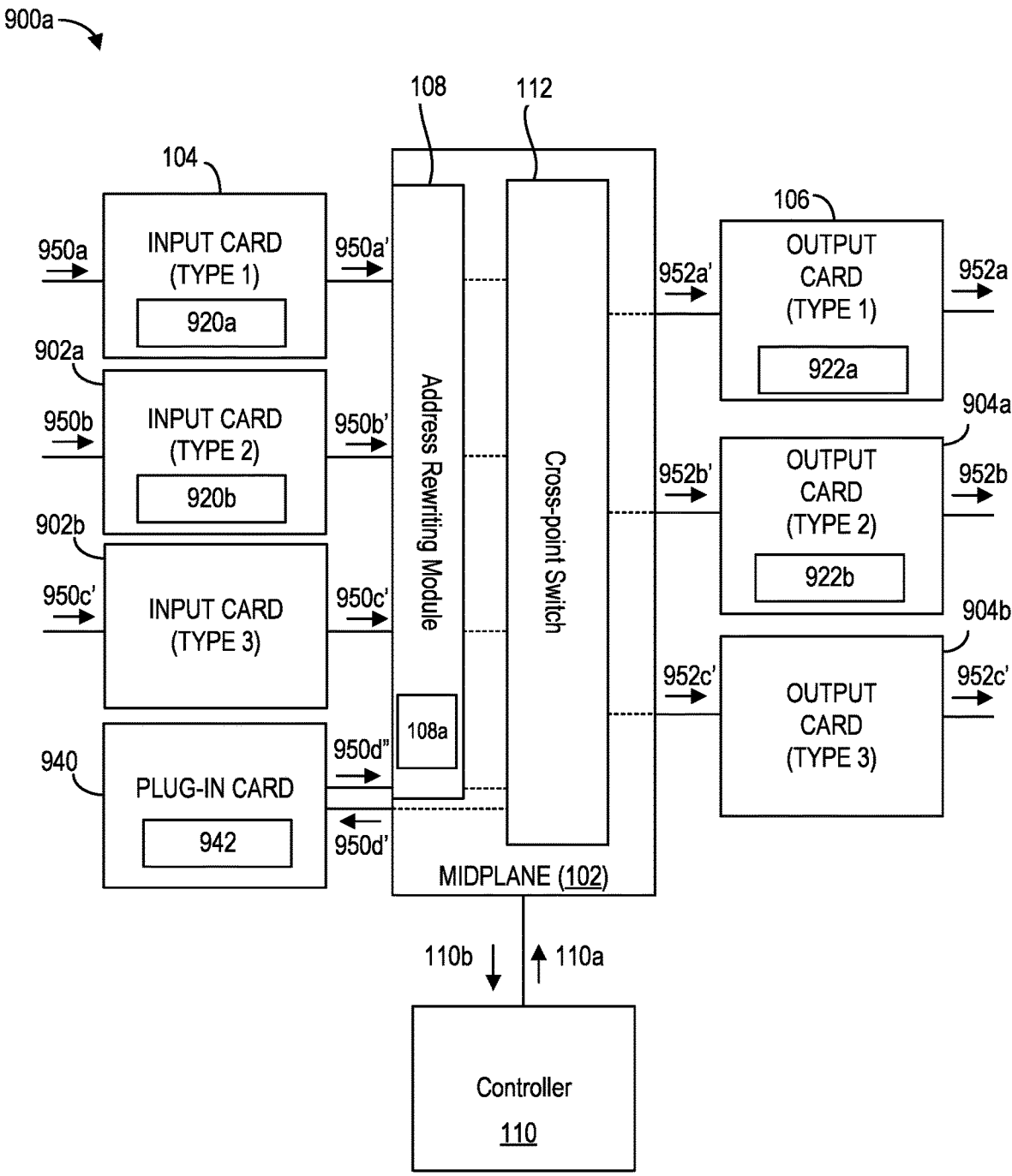
FIG. 9A is a block diagram of an SDI router in accordance with other example embodiments.

Reference is now made to FIG. 9A, which shows an example embodiment of serial digital interface (SDI) router 900*a*, in accordance with another embodiment.

The SDI router 900*a* is generally analogous to the SDI routers 100 and 200 of FIGS. 1 and 2, respectively, but is adapted to accommodate different types of input and output signals.

As shown, SDI router 900*a* may accommodate several types of input cards 104 and 902*a*-902*b*, which accommodate different types of input signals received from various upstream devices, networks and/or routers. In some embodiments, the input cards are removably connected to the SDI router 900a. In some other embodiments, some or all of the input cards are permanently connected to the SDI router 900a.

For example, SDI router 900a may accommodate an input card 104, which is analogous to the input card 104 of SDI router 100 (FIG. 1). This input card (also referred to herein as "type one" input card), can receive SDI signals 950a, and may convert these signals into one or more corresponding IP signals 950a', as explained previously. The one or more IP signals 950a' are then transmitted to the address rewriting module 108 in the midplane 102 for routing by crosspoint switch 112. As shown, the input card 104 may include input signal processing hardware 920a for performing the SDI-to-IP signal conversion, among other signal processing functions (e.g., frame synchronization, etc.).

SDI router 900a also accommodates a second type of input card 902a (also referred to herein as a "type two" input card). Input card 902a may receive one or more non-IP, non-SDI signals 950b, and may convert these signals into one or more corresponding IP signals 950b'. The IP signals 950b' are again transmitted to the address rewriting module 108 in the midplane 102, and routed through the crosspoint switch 112.

In one example, the received non-IP, non-SDI signal, at input card 902a, is an HDMI (High-Definition Multimedia Interface) interface signal, which is converted into one or more corresponding IP signals 950b'. The HDMI signal may carry uncompressed video data and/or compressed or uncompressed digital audio data from an upstream HDMI-source.

In this example, the input card 902a includes an input signal processing hardware 920b for effecting the signal conversion (e.g., HDMI-to-IP conversion), among other signal processing functionalities (e.g., frame synchronization, etc).

A third type of input card 902b is also connected to the midplane 102 (also referred to herein as a "type three" input card). Input card 902c may receive one or more IP signals 950c, and may simply pass these IP signals directly to the address rewriting module 108 in midplane 102, i.e., without any further signal conversion processing. For example, the IP signals 950c may be received from other upstream IP devices and networks. In some cases, the IP signals 950c may be received directly from another upstream IP router. In some example cases, the upstream IP router may have a similar midplane 102 architecture as shown in router 900a. Accordingly, the IP signals may be received either directly from that router's crosspoint switch 112, or indirectly though a respective pass-through output card of that router.

In some cases, input card 902b may include signal processing hardware (not shown). This hardware is not used to convert the IP signal to a different format, but to simply process the IP signals 950c' to generate one or more corresponding modified IP signals. The modified IP signals are then transmitted to the address re-writing module 108 of the midplane 102. For example, the signal processing performed by the input card 902b may include video resolution conversion of received video IP signals (e.g., 4K to 1080p). In one example, where the end destination is a multiviewer, and where multiple video, audio and/or miscellaneous IP streams are received, the input card 902b may perform various resizing operations to compose a multiview. The resized signals are then sent to the midplane 102. In other examples, the signal processing by input card 102 may involve frame synchronization between different IP streams.

Referring now to the output side of the mid plane 102, the SDI router 900a may also include different types of output cards for transmitting different types of output signals to downstream devices, networks and/or routers. In some embodiments, the output cards are removably connected to the SDI router 900a. In some other embodiments, some or all of the output cards are permanently connected to the SDI router 900a.

As shown, the SDI router 900a can include an output card 106, which is analogous to output card 106 in FIG. 1. This output card (also referred to herein a "type one" output card), receives one or more IP signals 950a' from cross-point switch 112, and converts these signals into SDI signals 950a for transport to downstream devices, networks and/or routers, as explained herein. This conversion processing may be effected by an output signal processor 922a.

SDI router 900a may also include a second type (or type two) output card 904a, which receives one or more IP signals 952b' from cross-point switch 112, and may further convert these signals into one or more non-IP, non-SDI signals 952b (e.g., HDMI signals). This can be performed by an output signal processor 922b which performs the signal conversion (e.g., HDMI-to-IP conversion). In some cases, signal processor 922b can also perform other functions, e.g., frame synchronization between multiple associated IP signals 952b'.

A third type of output card 904b (or a type three output card) may also be included in the SDI router 900a. This output card is analogous to the "type three" input card 902b, and may also simply directly pass-through one or more received IP signals 952c' from cross-point switch 112 to other downstream devices and/or networks.

In some cases, the IP signals 952c' passed-through by the output card 904a may be transmitted to other downstream IP routers. In some example cases, the downstream IP routers may have a similar midplane 102 architecture as shown in router 900a, and the IP signals may therefore be transmitted to the respective address rewriting module 108 of that router (i.e., either directly, or via a respective passthrough input card of that IP router). In some cases, the downstream IP router may be the same router as the upstream IP router connected to the pass-through input card 902b.

In some cases, the output card 904b may include a signal processor (not shown) operable to perform various other non-conversion based signal processing functionalities to the IP signal 952b'. For example, these can include similar signal processing functionalities as explained with reference to the type three input card 902b. Accordingly, the output card 904b may pass-through one or more corresponding modified IP signals to the downstream devices, networks and/or routers.

While the SDI router 900a is shown as including a number of different input cards and output cards, it will be understood that each of these cards may equally function as an input/output (I/O) card, as shown in router 200 of FIG. 2. For example, the type one input card 104 and type two output card 106 may be simply combined as a single I/O card 114 in FIG. 2.

SDI router 900a can also include a plug-in card 940 coupled to the midplane 102. Plug-in card 940 may receive IP streams 950d' directly from the cross-point switch 112 (e.g, associated or related video, audio and miscellaneous IP streams). The plug-in card 940 may include a signal processor 942 which processes these IP signals to generate corresponding modified IP streams 950d''. The modified IP streams are then transmitted back to the address rewriting module 108. Accordingly, the plug-in card 940 does not perform any signal format conversion, but merely processes the IP signals for further internal routing using the signal processor 942. This processing may be the same type of processing explained previously with respect to pass-through input card 902b and pass-through output card 904b.

While the plug-in card 940 is shown as being connected to the input side of the SDI router 900a, it will be understood that plug-in card 940 may also be coupled the "output side" of router 900a while accomplishing the same function.

While not shown, it is also possible that the plug-in card 940 may also receive external signals from other upstream IP signal sources (e.g., device, networks and/or routers). In this case, the plug-in card 940 can again process these external IP signals to generate corresponding modified IP signals. The modified IP signals may then be transmitted to one or more of: (i) the address rewriting module 108 of midplane 102 for further routing, and/or (ii) other external downstream IP devices, networks and/or routers.

While only a single processor is shown in respect of each input, output and plug-in card, it will be appreciated that in other embodiments, each card may include multiple iterations of each type of signal processor. Each of the processors, within a given card, may be coupled to the same or different input and output ports of that card. Each of the processors can therefore provide independent and parallel processing functionality, to enable for higher processing capacity and data throughput for each card.

Figure 9B:
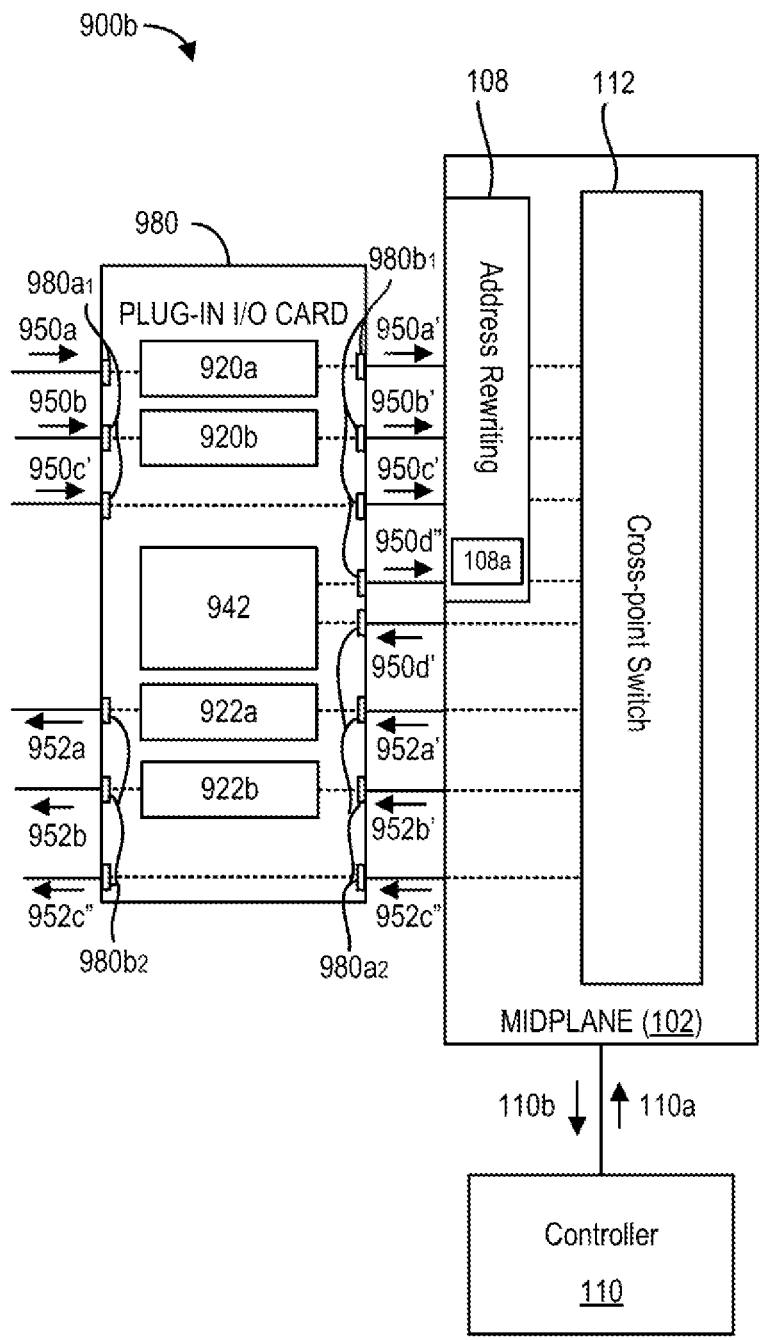
FIG. 9B is a block diagram of an SDI router in accordance with still other example embodiments.

Reference is now made to FIG. 9B, which shows an example embodiment of a serial digital interface (SDI) router 900b, in accordance with another embodiment.

As shown, router 900b includes a plug-in input/output (I/O) card 980 (also referred to herein as an augmented plug-in card 980), which integrates the functionalities of the input cards 104, 902a-902b, output cards 106, 904a-904b and plug-in card 940 of router 900a of FIG. 9A.

To this end, the augmented plug-in card 980 can include one or more input ports 980a and one or more output ports 980b. Input ports 980a may include two types of input ports, namely: (i) a first type of input port 980a$_1$ coupled to various upstream device, networks and/or routers, and (ii) a second type of input port 980a$_2$ coupled to cross-point switch 112 of the midplane 102. Output ports 980b can also include two types of output ports, namely, (i) a first type of output port 980b$_1$ coupled to the address re-writing module 108 of the midplane 102, and (ii) a second type of output port 980b$_2$ coupled to various downstream devices, networks and/or routers Augmented plug-in card 980 further includes various types of signal processors 920a, 920b, 920c, 922a, 922b and 942 which are analogous in function to those explained in FIG. 9A. Each signal processor may couple to one or more processor-specific input and output ports of the plug-in card 980.

By way of an example, input signal processor 920a may couple to one or more first input ports 980a$_1$, to receive SDI signals 950a therefrom. Signal processor 920a may process and convert these signals into corresponding IP signals 950a', and may transmit the IP signals to the address rewriting module 108 of midplane 102, via one or more first output port 980b$_1$.

Input signal processor 920b may couple to one or more input ports 980a$_1$, to receive non-SDI, non-IP signals 950b (e.g., HDMI signals) therefrom. Signal processor 920b may then process and convert these signals into corresponding IP signals 950b', and may transmit these IP signals to the address rewriting module 108 of midplane 102, via one or more first output port 980b$_1$.

Output signal processor 922a may couple to one or more second input ports 980a$_2$, to receive one or more IP signals 952a' from the cross-point switch 112. Signal processor 922a may then process and convert these signals into corresponding SDI signals 952a, and may transmit the SDI signals externally via one or more second output ports 980b$_2$.

Output signal processor 922b may couple to one or more second input ports 980a$_2$, to receive one or more IP signals 952b' from the cross-point switch 112. Signal processor 922b may then process and convert these signals into corresponding non-IP, non-SDI signals 952b (e.g., HDMI signals), and may transmit these signals externally via one or more second output ports 980b$_2$.

SDI router 900b may also include the signal processor 942, which can couple to one or more second input ports 980a$_2$, to receive one or more IP signals 950d' from the cross-point switch 112. Signal processor 942 may then process these signals as explained herein, and may transmit one or more corresponding modified IP signals 950d'' to the address rewriting module 108, via one or more second output port 980b$_1$.

As explained previously, in some cases the same or a separate signal processor 942 may also receive external IP signals, and may process these signals to generate corresponding modified IP signals. The modified IP signals may then be transmitted to the address rewriting module 108 of midplane 102, or otherwise, to other downstream IP devices, networks and/or routers.

Plug-in card 980 can also include one or more direct connections between input and output ports 980a, 980b. For example, one or more first input ports 980a$_1$ may receive IP signal(s) 950c' from upstream devices, networks and/or routers, and may pass-through these signals directly to one or more first output port 980b$_1$, i.e., coupled to the address re-writing module 108.

Similarly, one or more second input ports 980a$_2$ of plug-in card 980 may receive one or more IP signals 950c'' from the cross-point switch 112, and may pass these signals directly to one or more second output port 980b$_2$ coupled to one or more downstream devices, networks and/or routers.

In some cases, prior to passing the signals through, the signals may be processed using a similar signal processor as processor 942. In this manner, the passed through IP signals are modified versions of the received IP signals.

In some cases, the augmented card 980 may include multiple "copies" of each type of signal processor. For example, several of each type of signal processor may be connected to different input and output ports of the card 980 to provide independent and parallel processing functionality, and to enable for higher processing capacity and data throughput for the card 980.

In some cases, rather than connecting each processor to a separate input and output port, several processors may share the same input and output ports. In these cases, the plug-in card may have a routing module (not shown) to direct or route incoming or outgoing signals to the correct processor. The routing functionalities may be independently controlled from with-in, or externally controlled by, for example, an external controller (e.g., controller 110).

In some cases routing signals within plug-in card 980 to the appropriate signal processor (i.e., via the routing module) may be achieved by accounting for various routing parameters.

For example, routing can be determined based on a known source or destination of a signal. For instance, specific upstream or downstream sources may be known to transmit or receive specific types of signal formats (e.g., SDI, IP or non-IP, non-SDI). Accordingly, signals may be routed to, and processed by the relevant signal processor to achieve the necessary format conversion. In other cases, the routing parameters may be related to the time of day the signal is received or transmitted. For example, different formats of signals may be known to be received at different times of day, or are otherwise required to be transmitted in particular formats at different times of day. Monitoring the time may be performed by an internal clock of the routing module and/or external controller. Still further, the routing module may have internal processing functionalities to analyze signals to determine the type of signal being received and/or the processing required to be applied to that signal. For example, a signal can be received and analyzed to determine that it's an HDMI signal, and therefore requires to, processing by signal processor 920*b*, etc.

In still other embodiment, rather than combining all of the signal processors 920, 922 and 942 into a single augmented plug-in card 980, the processors may be distributed among multiple augmented cards 980. For example, some augmented cards 980 may include some signal processors (e.g., 920*a*, 920*b*, 942), while other augmented cards 980 may include other signal processors (e.g., 922*a*, 922*b*). Some augmented cards 980 may further include a combination of signal processing and/or direct pass through functionality. Accordingly, it will be understood that, as used herein, an augmented card is any card having a combination of one or more signal processing and/or direct pass-through functionality.

In still yet other embodiments, a single processor can be provided in the augmented plug-in card 980 which provides all or some of the functionalities of the processors 920, 922 and 942. For example, the plug-in card 980 may include a single processor which preforms all functionalities of processors 920, 922 and 940, or in other cases, several separate processors that each perform different combined functionalities of processors 920, 922 and 940.

While the above description describes features of example embodiments, some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description.

Various embodiments in accordance with the teachings herein are described to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, where considered appropriate, reference numerals may be repeated among the figures to indicate corresponding or analogous elements or steps. In addition, numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the example embodiments described herein.

It should also be noted that the terms "coupled" or "coupling" as used herein can have several different meanings depending in the context in which these terms are used. For example, the terms coupled or coupling can have a mechanical, fluidic or electrical connotation. For example, as used herein, the terms coupled or coupling can indicate that two elements or devices can be directly connected to one another or connected to one another through one or more intermediate elements or devices via an electrical or magnetic signal, electrical connection, an electrical element or a mechanical element depending on the particular context. Furthermore coupled electrical elements may send and/or receive data.

Unless the context requires otherwise, throughout the specification and claims which follow, the word "comprise" and variations thereof, such as, "comprises" and "comprising" are to be construed in an open, inclusive sense, that is, as "including, but not limited to".

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

Reference throughout this specification to "one embodiment", "an embodiment", "at least one embodiment" or "some embodiments" means that one or more particular features, structures, or characteristics may be combined in any suitable manner in one or more embodiments, unless otherwise specified to be not combinable or to be alternative options.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Similarly, throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), optical pathways (e.g., optical fiber), electromagnetically radiative pathways (e.g., radio waves), or any combination thereof. Exemplary communicative couplings include, but are not limited to, electrical couplings, magnetic couplings, optical couplings, radio couplings, or any combination thereof.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a keyboard, mouse, touchscreen, or the like), and at least one output device (e.g. a display screen, a printer, a wireless radio, or the like) depending on the nature of the device.

The invention claimed is:

1. A system for routing an input serial digital interface (SDI) signal from an input SDI port to an output SDI port, the system comprising:
at least one input card coupled to the input SDI port;
at least one output card coupled to the output SDI port;
a midplane coupled to the at least one input card and the at least one output card; and
a controller coupled to the midplane configured to:
determine addressing rules, the addressing rules corresponding to a destination address for the input SDI signal;
generate a control signal corresponding to the addressing rules; and
transmit the control signal to the midplane;
the at least one input card being configured to:
receive the input SDI signal at the input SDI port;
process the input SDI signal to generate one or more packetized media streams, each packetized media stream comprising a plurality of packets, wherein each packet has a packet header comprising a source address corresponding to that packetized media stream; and
transmit each packetized media stream from an IP output port to the midplane;
the midplane being configured to:
identify the source address corresponding to each packet of a packetized media stream;
update the corresponding packets of each packetized media stream with a destination address based on the control signal from the controller, and generate a corresponding processed packetized media stream; and
route the processed packetized media stream to an output card based on the destination address; and
the output card being configured to:
receive one or more processed packetized media streams at an input IP port;
process the one or more processed packetized media streams to generate a corresponding output SDI signal; and
providing the output SDI signal at the output SDI port.

2. The system of claim 1, wherein the source address includes a flow identifier uniquely identifying the corresponding packetized media stream.

3. The system of claim 2, wherein the flow identifier is related to the SDI input port receiving the input SDI signal corresponding to the packetized media stream.

4. The system of claim 2, wherein the flow identifier identifies source information associated with the packetized media stream.

5. The system of claim 2, wherein the flow identifier identifies the input card and the SDI input port receiving the input SDI signal corresponding to the packetized media stream, and the output IP port transmitting the packetized media stream.

6. The system of claim 2, wherein the source address further includes a routing identifier, wherein the routing identifier identifies source information associated with the packetized media stream.

7. The system of claim 2, wherein the source address further includes a routing identifier, wherein the routing identifier identifies the input card and the SDI input port receiving the input SDI signal corresponding to the packetized media stream, and the output IP port transmitting the packetized media stream.

8. The system of claim 1, wherein the destination address includes a flow identifier uniquely identifying the corresponding processed packetized media stream.

9. The system of claim 8, wherein the flow identifier is related to the SDI output port receiving the output SDI signal corresponding to the processed packetized media stream.

10. The system of claim 8, wherein the flow identifier identifies destination information associated with the processed packetized media stream.

11. The system of claim 8, wherein the flow identifier identifies the output card and the SDI output port providing the output SDI signal corresponding to the processed packetized media stream, and the input IP port receiving the processed packetized media stream.

12. The system of claim 8, wherein the destination address further includes a routing identifier, wherein the routing identifier identifies destination information associated with the processed packetized media stream.

13. The system of claim 8, wherein the destination address further includes a routing identifier, wherein the routing identifier identifies the output card and the SDI output port providing the output SDI signal corresponding to the processed packetized media stream, and the input IP port receiving the packetized media stream.

14. The system of claim 2, wherein an address inserting module in the midplane is configured to replace the flow identifier associated with the source address with a flow identifier associated with the destination address.

15. The system of claim 7, wherein an address inserting module in the midplane is configured to replace the routing identifier associated with the source address with a routing identifier associated with the destination address.

16. The system of claim 1, wherein an address inserting module in the midplane is configured to append the destination address to the source address of the packet header.

17. The system of claim 1, wherein an address inserting module in the midplane is configured to replace the source address of the packet header with the destination address.

18. The system of claim 1, wherein the midplane comprises a crosspoint switch and wherein the controller is configured to determine the addressing rules based on traffic load information received from the crosspoint switch.

19. The system of claim 1, wherein the controller is configured to determine the addressing rules based on content requirements of downstream devices.

20. The system of claim 2, wherein the controller is configured to determine the addressing rules based on an assignment of the flow identifier to the output SDI port.

* * * * *